US011488493B2

(12) United States Patent
Rosenberg et al.

(10) Patent No.: US 11,488,493 B2
(45) Date of Patent: Nov. 1, 2022

(54) MULTI-DIMENSIONAL CYBERSECURITY SKILLS ASSESSMENT METHOD AND SYSTEM

(71) Applicant: EC-Council International Limited, Hong Kong (HK)

(72) Inventors: Timothy S. Rosenberg, Lancaster, PA (US); Dwight Hobbs, York, PA (US)

( * ) Notice: Subject to any disclaimer, the term of this patent is extended or adjusted under 35 U.S.C. 154(b) by 67 days.

(21) Appl. No.: 16/569,250

(22) Filed: Sep. 12, 2019

(65) Prior Publication Data

US 2021/0082309 A1  Mar. 18, 2021

(51) Int. Cl.
  *G09B 19/00* (2006.01)
  *G06F 9/451* (2018.01)

(52) U.S. Cl.
  CPC ......... *G09B 19/0053* (2013.01); *G06F 9/451* (2018.02)

(58) Field of Classification Search
  CPC .............................. G09B 19/0053; G06F 9/451
  See application file for complete search history.

(56) References Cited

U.S. PATENT DOCUMENTS

| | | | |
|---|---|---|---|
| 9,870,715 B2 | 1/2018 | Sadeh-Koniecpol et al. | |
| 10,600,335 B1* | 3/2020 | Donovan | G09B 19/0053 |
| 2009/0319247 A1* | 12/2009 | Ratcliffe, III | H04L 63/1433 |
| | | | 703/13 |
| 2009/0319249 A1* | 12/2009 | White | H04L 41/145 |
| | | | 703/13 |
| 2010/0021870 A1* | 1/2010 | Patten | G09B 7/02 |
| | | | 434/118 |
| 2014/0199663 A1 | 7/2014 | Sadeh-Koniecpol et al. | |
| 2014/0287383 A1* | 9/2014 | Willingham | G09B 19/0053 |
| | | | 434/118 |
| 2016/0301716 A1 | 10/2016 | Sadeh-Koniecpol et al. | |
| 2017/0032694 A1* | 2/2017 | Brueckner | G09B 19/0053 |
| 2017/0103674 A1 | 4/2017 | Sadeh-Koniecpol et al. | |
| 2017/0140660 A1* | 5/2017 | Morton | A63F 9/24 |
| 2017/0140663 A1 | 5/2017 | Sadeh-Koniecpol et al. | |
| 2019/0066530 A1* | 2/2019 | Lee | G09B 7/00 |
| 2019/0123975 A1 | 4/2019 | Telles et al. | |
| 2019/0228161 A1 | 7/2019 | Grindstaff, II et al. | |

(Continued)

OTHER PUBLICATIONS

"VMware ESXI"; Wikipedia; accessed Aug. 14, 2019; 9 pages. https://en.wikipedia.org/wiki/VMware_ESXi.

(Continued)

*Primary Examiner* — Peter R Egloff
(74) *Attorney, Agent, or Firm* — Ortiz & Lopez, PLLC; Kermit D. Lopez; Luis M. Ortiz

(57) ABSTRACT

A method, system and computer usable program product for assessing a cybersecurity skill of a participant, can involve generating and outputting to an I/O device, a user interface that includes user input fields for receiving data related to a cybersecurity task from a participant of a cybersecurity assessment facilitated by the user interface, the user interface operable to assess a cybersecurity skill of the participant as a part of the cybersecurity assessment. The cybersecurity skill of the participant via can be assessed via the user interface, based on metrics that indicate how the participant achieved the cybersecurity task as compared to at least one other participant of the cybersecurity assessment, and after the cybersecurity task has been completed by the participant via the user interface.

20 Claims, 19 Drawing Sheets

(56) References Cited

U.S. PATENT DOCUMENTS

2019/0244127 A1  8/2019  Amado et al.
2019/0253448 A1  8/2019  Zaffarano et al.
2019/0319985 A1* 10/2019 Kim .................. G09B 19/0053
2020/0410894 A1* 12/2020 May .................. G09B 19/0053

OTHER PUBLICATIONS

"Virtual LAN"; Wikipedia; accessed Aug. 14, 2019; 8 pages. https://en.wikipedia.org/wiki/Virtual_LAN.
"Machine learning"; Wikipedia; accessed Aug. 20, 2019; 21 pages. https://en.wikipedia.org/wiki/Machine_learning.
"Hypervisor"; Wikipedia; accessed Aug. 14, 2019; 7 pages. https://en.wikipedia.org/wiki/Hypervisor.
"Gamification"; Wikipedia; accessed Aug. 14, 2019; 19 pages. https://en.wikipedia.org/wiki/Gamification.

* cited by examiner

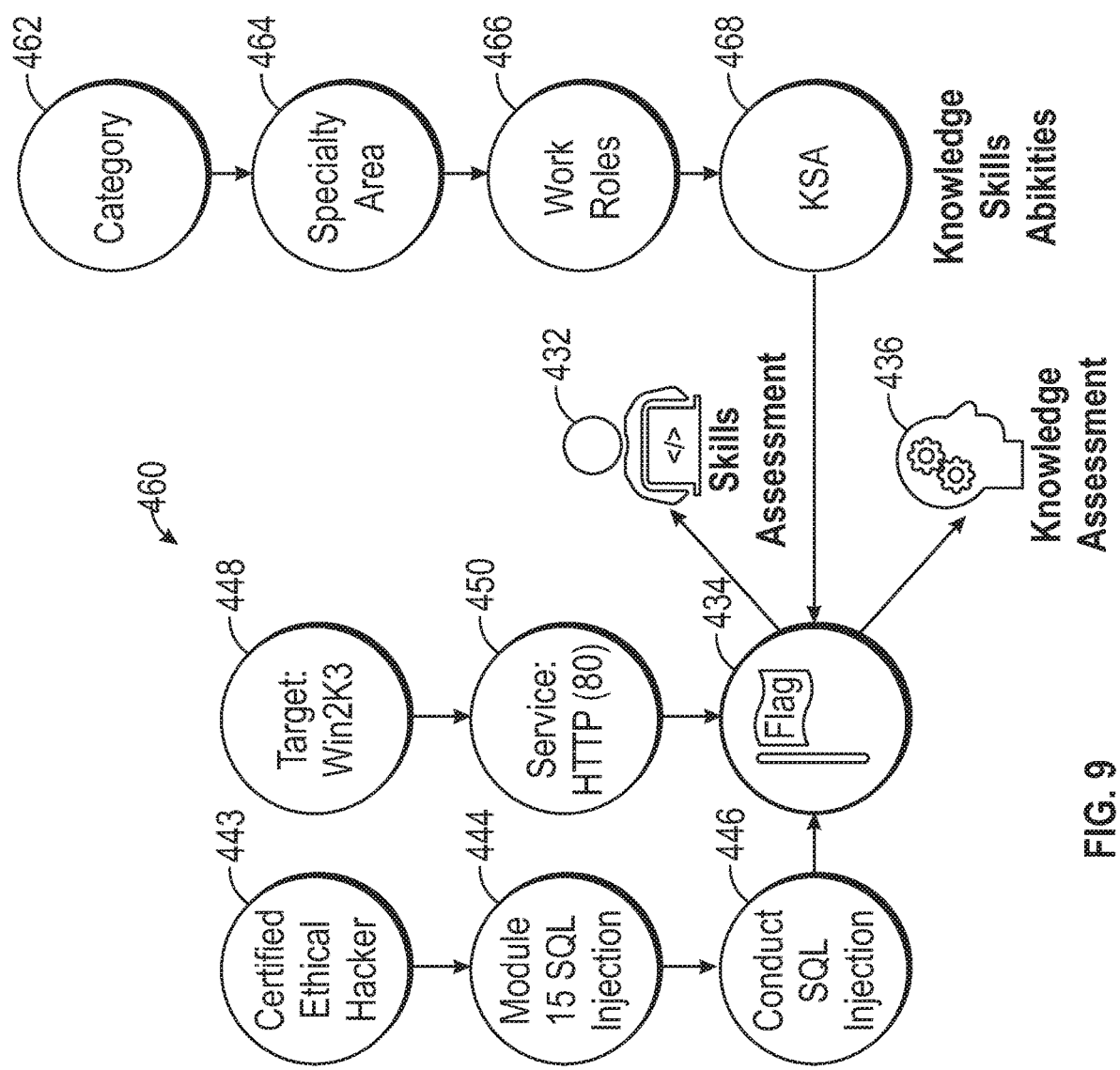
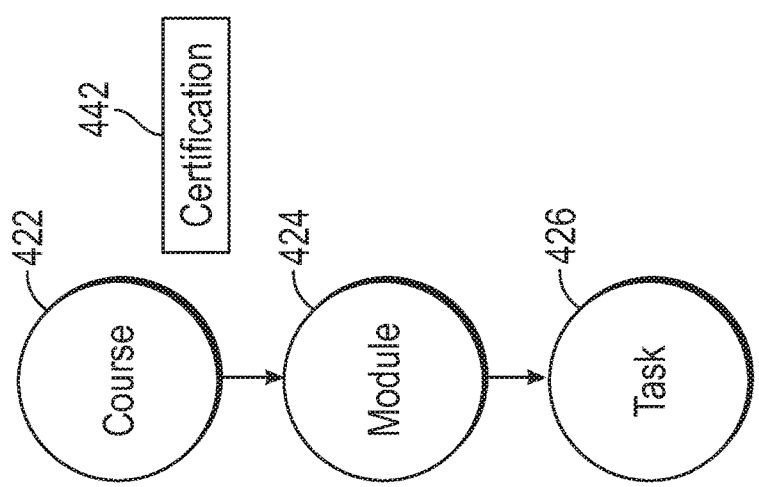
FIG. 9

| Module | Total Questions | Correct Questions | Incorrect Questions | Average Confidence |
|---|---|---|---|---|
| Scanning Networks | 2 | 1 | 1 | 4.5 |
| Enumeration | 1 | 0 | 1 | 4 |
| Vulnerability Analysis | 1 | 0 | 1 | 3 |
| System Hacking | 1 | 0 | 1 | 4 |

Knowledge Baased Reporting

FIG. 11

| # | Flag Text | Task | Module | Achieved Score | Total Score |
|---|---|---|---|---|---|
| 1 | What is AD? | Banner grabbing | Scanning Networks | 60 | 60 |
| 2 | Type of AD | Use nmap to pong sweep a subnet | Scanning Networks | 50 | 50 |
| 3 | What is exchange services? | Scan a system behind a firewall | Scanning Networks | 25.6 | 40 |
| 4 | Default IP address? | Use nmap to identify open UDP ports | Scanning Networks | 50 | 50 |
| 5 | What is the port running at 289 | Use nmap to identify open TCP ports | Scanning Networks | 100 | 100 |
| 6 | What is the service running at port 139 on 10.10.9.14 | Use nmap to identify open TCP ports | Scanning Networks | 0 | 100 |
| 7 | Which service running at 139 port | Use nmap to identify open TCP ports | Scanning Networks | 0 | 100 |

Skills Based Reporting

+ New Target

New Target — 502

Name  Sample

Select VM  [Win2k SQL ▼] ← 508

| VM Name | No. of CPUs | RAM | Guest OS | Hostname IP | VMTools Status | CPU Use | RAM Use | Status | Power Status | | Username | Password |
|---|---|---|---|---|---|---|---|---|---|---|---|---|
| Win2k SQL | 1 | 0.5GB | win2000 ServGuest | | Tools Old | 25 | 51 | Green ↻ | Powered On ↻ | ↻ | Username | Password |

504 → 506

[Next]

FIG. 14

+ New Target - Add Service — 510

Target Information

| Select Service | Port Number | Username | Password | Notes | Filename | Points | Action |
|---|---|---|---|---|---|---|---|
| [HTTP ▼] ← 511 | 80 | Enter Username | Enter Password | No Notes | Flag html | [100 ▲▼] ← 512 | ▼ |

[+ Add New Service] ← 514

[Back]  [Next]

Add Flag

| | | | |
|---|---|---|---|
| Flag Name | What is SQL Injection String? ▲▼ — 522 | Flag Type | String ▲▼ — 530 |
| Answer | 1=1 ▲▼ — 524 | Points | 100 ▲▼ — 532 |
| Course | CEHv10 ▲▼ — 526 | Module | SQL ▲▼ — 534 |
| Task | Conduct SQL Injection Attack ▲▼ — 528 | Duration (Mins) | 15 ▲▼ — 536 |

+ Add New — 538

Back — 542    Reset — 544    Done — 540

MULTI-DIMENSIONAL CYBERSECURITY SKILLS ASSESSMENT METHOD AND SYSTEM

TECHNICAL FIELD

Embodiments are related to the field of cybersecurity. Embodiments also relate to the field of cybersecurity skills training and assessment. Embodiments further relate to data-processing systems and user interfaces that provide multi-dimensional cybersecurity skills training and assessment.

BACKGROUND

Cybersecurity involves technologies, including processes, practices, hardware modules, software modules, firmware modules, etc., and combinations thereof, designed to impact networks, computers, programs and data in terms of attack, damage or unauthorized access. A variety of technologies are available to provide defensive and offensive cybersecurity impact in a computer network environment.

Training and assessment of cybersecurity skills and capabilities of cybersecurity students, practitioners and professionals typically requires specialized cybersecurity training software and often a team of cybersecurity experts and trainers with expertise in many areas of cybersecurity. Such training and assessment may be facilitated by, for example, CBT (Computer-Based Training) systems, and WBT (Web-Based Training) systems, which are forms of computer-based training that use an LMOS (Learning Management System). These approaches to learning have also been referred to as e-instruction or web-based instruction or simply as e-learning.

Differences between CBT and WBT include the fact that CBT in some cases may not be connected to a network, and WBT may include communications among different participants. Most forms of modern e-learning are inspired by this paradigm in the form of WBT. An LCMS (Learning Content Management System) sometimes also referred to as a "Course Management System", a "Pedagogical Platform", or an "ELearning Platform", is a software system that delivers courseware plus e-tutoring over the Internet, and allows users to create and manage learning content.

These current "e-learning" approaches to cybersecurity training and assessment are two-dimensional or binary in nature. For example, such approaches to cybersecurity training and assessment only provide assessment information indicating whether or not a question was answered correctly or not, the amount of time taken to complete a task or answer questions, along with scoring based on arbitrary points, and the lack of enabling new challenges and targets for a user. In addition, current approaches are subject to the whims of the particular vendor offering the cybersecurity training and assessment.

While current cybersecurity "e-learning" approaches are more effective in certain circumstances than manual human teaching techniques, current cybersecurity digital teaching and learning systems are not sufficiently powerful, engaging, versatile, intelligent, or sufficiently adaptive to maximize the testing effect, particularly when dealing with certain individuals or groups that may have difficulty with conventional modes of test taking.

Thus, there is a need for improved systems and methods for computerized learning that can offer greater effectiveness or with fewer drawbacks as discussed above.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a method, system and computer usable program product for assessing cybersecurity skills.

It is another aspect of the disclosed embodiments to provide for an improved method, system and computer usable program product for assessing the cybersecurity skill of a participant in a gamified learning environment.

The aforementioned aspects and other objectives and advantages can now be achieved as described herein.

In an embodiment, a method for assessing a cybersecurity skill of a participant, can involve: generating and outputting to an I/O device, a user interface comprising a plurality of user input fields for receiving data related to a cybersecurity task from a participant of a cybersecurity assessment facilitated by the user interface, the user interface operable to assess a cybersecurity skill of the participant as a part of the cybersecurity assessment; and assessing the cybersecurity skill of the participant via the user interface, based on metrics that indicate how the participant achieved the cybersecurity task as compared to at least one other participant of the cybersecurity assessment, after the cybersecurity task has been completed by the participant via the user interface.

In an embodiment, the user interface can comprise a web application portal.

In an embodiment, the user interface can comprise a gamified GUI (Graphical User Interface) that is accessible by the participant and the at least one other participant.

In an embodiment, the metrics can include an amount of network traffic generated during the cybersecurity task performed by the participant.

In an embodiment, the metrics can include a number of network detection alerts generated as a result of the cybersecurity task performed by the participant.

In an embodiment, the metrics can include an overall difficulty rating of the cybersecurity task.

In an embodiment, the user can be accessible by at least one of: a content designer, an assessor, a team leader and a practitioner.

In an embodiment, the user interface can be operable to handle range management, assessment, multi-player reporting and multi-event reporting.

In an embodiment, a system can assess a cybersecurity skill of a participant, and can include: at least one processor and a memory, the memory storing instructions to cause the at least one processor to perform: generating and outputting to an I/O device, a user interface comprising a plurality of user input fields for receiving data related to a cybersecurity task from a participant of a cybersecurity assessment facilitated by the user interface, the user interface operable to assess a cybersecurity skill of the participant as a part of the cybersecurity assessment; and assessing the cybersecurity skill of the participant via the user interface, based on metrics that indicate how the participant achieved the cybersecurity task as compared to at least one other participant of the cybersecurity assessment, after the cybersecurity task has been completed by the participant via the user interface.

In an embodiment, a computer usable program product for assessing a cybersecurity skill of a participant, the computer usable program product can include one or more computer-readable storage devices, and program instructions stored on at least one of the one or more storage devices, the stored program instructions comprising: program instructions to generate and output to an I/O device, a user interface comprising a plurality of user input fields for receiving data related to a cybersecurity task from a participant of a cybersecurity assessment facilitated by the user interface, the user interface operable to assess a cybersecurity skill of the participant as a part of the cybersecurity assessment; and program instructions to assess the cybersecurity skill of the participant via the user interface, based on metrics that indicate how the participant achieved the cybersecurity task as compared to at least one other participant of the cybersecurity assessment, after the cybersecurity task has been completed by the participant via the user interface.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description, serve to explain the principles of the disclosed embodiments.

FIG. 9 illustrates a block diagram depicting a system for assessing a cybersecurity skill of a participant in a gamified learning environment including skill assessment and knowledge assessment, in accordance with an embodiment;

FIG. 11 illustrates a user interface window for assessing a cybersecurity skill of a participant in a gamified learning environment including knowledge based reporting, in accordance with an embodiment;

FIG. 12 illustrates a user interface window for assessing a cybersecurity skill of a participant in a gamified learning environment including skills based reporting, in accordance with an embodiment;

FIG. 13 illustrates a user interface window for assessing a cybersecurity skill of a participant in a gamified learning environment including a field for adding a target, in accordance with an embodiment;

FIG. 14 illustrates a user interface window for assessing a cybersecurity skill of a participant in a gamified learning environment including a field for adding a service, in accordance with an embodiment;

FIG. 15 illustrates a user interface window for assessing a cybersecurity skill of a participant in a gamified learning environment including fields for adding a flag, in accordance with an embodiment;

FIG. 17 illustrates a user interface for assessing the cybersecurity skill of a participant in a gamified learning environment including fields for a target builder, in accordance with an embodiment;

FIG. 22 illustrates a user interface that can be implemented to display individual cybersecurity assessment results of a participant in a gamified learning environment, in accordance with an example embodiment.

DETAILED DESCRIPTION

Figure 1:
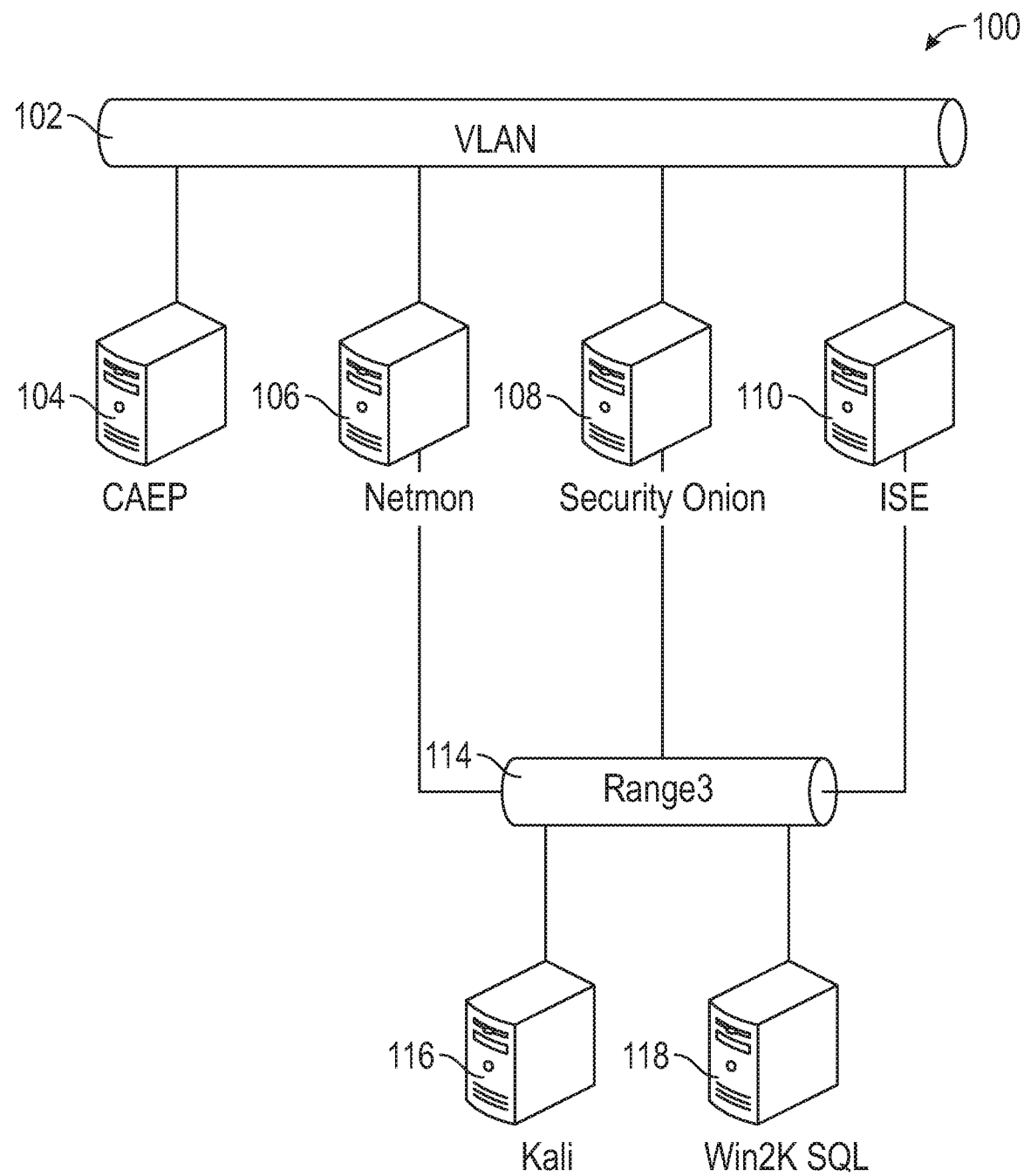
FIG. 1 illustrates a network diagram depicting a system for assessing the cybersecurity skills of a participant in the context of a single-player single gamified learning environment, in accordance with an embodiment.

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems/devices. Accordingly, embodiments may, for example, take the form of hardware, software, firmware or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms, such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation".

Unless defined otherwise, all technical and scientific terms used herein have the same meanings as commonly understood by one of ordinary skill in the art. As used in this document, the term "comprising" means "including, but not limited to."

A "computing device" or "electronic device" or "data processing system" or I/O (Input/Output) device can refer to a device or system that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like. Various elements of an example of a computing device or processor are described herein with reference to FIG. 18 and FIG. 19.

Note that the term "server" as utilized herein can relate to a computer (e.g., data-processing system), a device or a program that may be dedicated to managing network resources and which can process requests and deliver data to another computer, device or data-processing system over the Internet or another network (e.g., a local network).

FIG. 1 illustrates a network diagram depicting a system 100 for assessing the cybersecurity skills of a participant in the context of a single-player single gamified learning environment, in accordance with an embodiment. The system 100 depicted in FIG. 1 can include a group of servers including a CAEP (Cybersecurity Assessment Experience Platform) server 104, a server 106, a server 108, a server 110, a server 116, and a server 118. The CAEP server facilitates a platform for dynamic content, training and assessment.

Note that the term gamified as utilized herein relates to gamification, which is the application of game-design elements and game principles in non-game contexts, such as for example, training, learning and assessment. Gamification can be defined as a set of activities and processes to solve problems by using or applying the characteristics of game elements. Gamification may employ game design elements to improve user engagement, organizational productivity, and flow learning. Gamification in learning can be implemented as an approach to education with an intent to motivate students into learning through game elements in a learning environment. The term participant as utilized herein can refer to such a student, trainer, teacher, organizer, administrator, assessor or other participant in a gamified learning environment. Additionally the terms assess, assessing, and assessment relate to an evaluation and/or an estimate of the ability and/or quality of a cybersecurity skill of a participant in a gamified learning environment.

In FIG. 1, each server can be designated with a particular name, such as, for example, the server 104 ("CAEP"), the server 106 ("Netmon"), the server 108 ("Security Onion"), the server 110 ("ISE"), the server 116 ("Kali") and the server 118 ("Win2K SQL"). Such names are not considered limiting features of the disclosed embodiments but are included for general illustrative purposes only and to denote potential functions associated with such servers. For example, CAEP can relate to a gamified cybersecurity platform facilitated by the server 104.

Note that the term "Kali" as utilized herein (e.g., server 116) refers to Kali Linux, which is a Debian-based Linux distribution aimed at advanced penetration testing and security auditing (Debian refers to a Unix-like operating system composed of free and open-source software). Kali is a software application that may contain several hundred tools, which are geared towards various information security tasks, such as, for example, penetration testing, security research, computer forensics and reverse Engineering. Kali Linux as developed, funded and maintained by Offensive Security, an information security training company. It should be appreciated, however, that the disclosed embodiments are not limited to specific features such as Kali, and that other types of advanced penetration testing and security auditing software applications and modules may be used in other embodiments.

The term "Security Onion" as utilized herein relates to an open source Linux distribution for intrusion detection, enterprise security monitoring, and log management. The "Security Onion" module includes Elasticsearch, Logstash, Kibana, Snort, Suricata, Bro, Wazuh, Sguil, Squert, NetworkMiner, and many other security tools. Reference to Kali and other features such as "Security Onion", "Win2K SQL" and so on are provided herein for general illustrative and edification purposes only and are not limiting features of the disclosed embodiments.

The system 100 can further include a VLAN (Virtual Local Area Network) 102. Note that the term VLAN (Virtual Local Area Network) as utilized herein can relate to a virtual LAN (Local Area Network) that can function as a broadcast domain that can be partitioned and isolated in a computer network at the data link layer. LAN is an acronym for local area network and in this context the term virtual can refer to a physical object recreated and altered by additional logic. VLANs function by applying tags to network frames and handling these tags in networking systems—creating the appearance and functionality of network traffic that is physically on a single network but can act as if it is split between separate networks. In this manner, VLANs can keep network applications separate despite being connected to the same physical network, and without requiring multiple sets of cabling and networking devices to be deployed.

In the example shown in FIG. 1, the server 104, the server 106, the server 108, and the server 110 can communicate with the VLAN 102. The system 100 can further include a network 114 that can communicate with the server 106, the server 110, the server 116, and the server 118. In FIG. 1, the network 114 may be implemented as a range extended network, which is labeled "Range3".

It should be appreciated that each server shown in FIG. 1 constitutes a data processing system that can include one or more processors and a memory, wherein the memory stores instructions to cause the one or more processors to perform particular steps or operations. An example of such a data processing system is the data-processing system 620 depicted in FIG. 18.

The system 100 can be used to implement a number of cybersecurity skills and knowledge assessment. As will be discussed in greater detail herein, a single web application portal can be implemented for use by content designers, assessors, team leaders and practitioners. Such a web application portable is operable to handle range management, assessment (e.g., hands on and multiple choice), multiplayer reporting, and multi event reporting. Note that the term "web" as utilized herein relates to the "world wide web" or "Web", an Internet-based hypertext system The system 100 can generate and output to an I/O device (e.g., a data processing system), a user interface window that comprises a plurality of user input fields for receiving data related to a cybersecurity task from a participant of a cybersecurity assessment facilitated by the user interface. Such a user interface window is operable to assess a cybersecurity skill of the participant as a part of the cybersecurity assessment. The system 100 can assess the cybersecurity skill of the participant via the user interface, based on metrics that indicate how the participant achieved the cybersecurity task as compared to at least one other participant of the cybersecurity assessment, after the cybersecurity task has been completed by the participant via the user interface.

Note that the terms user interface window and window as utilized herein relate to a graphical interface element that can be used to display the content of an application for a user to view and interact with. A window may include a rectangular area that can be resized and is editable according to the capabilities and limitations imposed on it by the application providing it. A window is essential in facilitating multitasking in an OS (Operating System), as it can allow users to visually and manually switch between running applications and make general interactions with the operating system.

Figure 2:
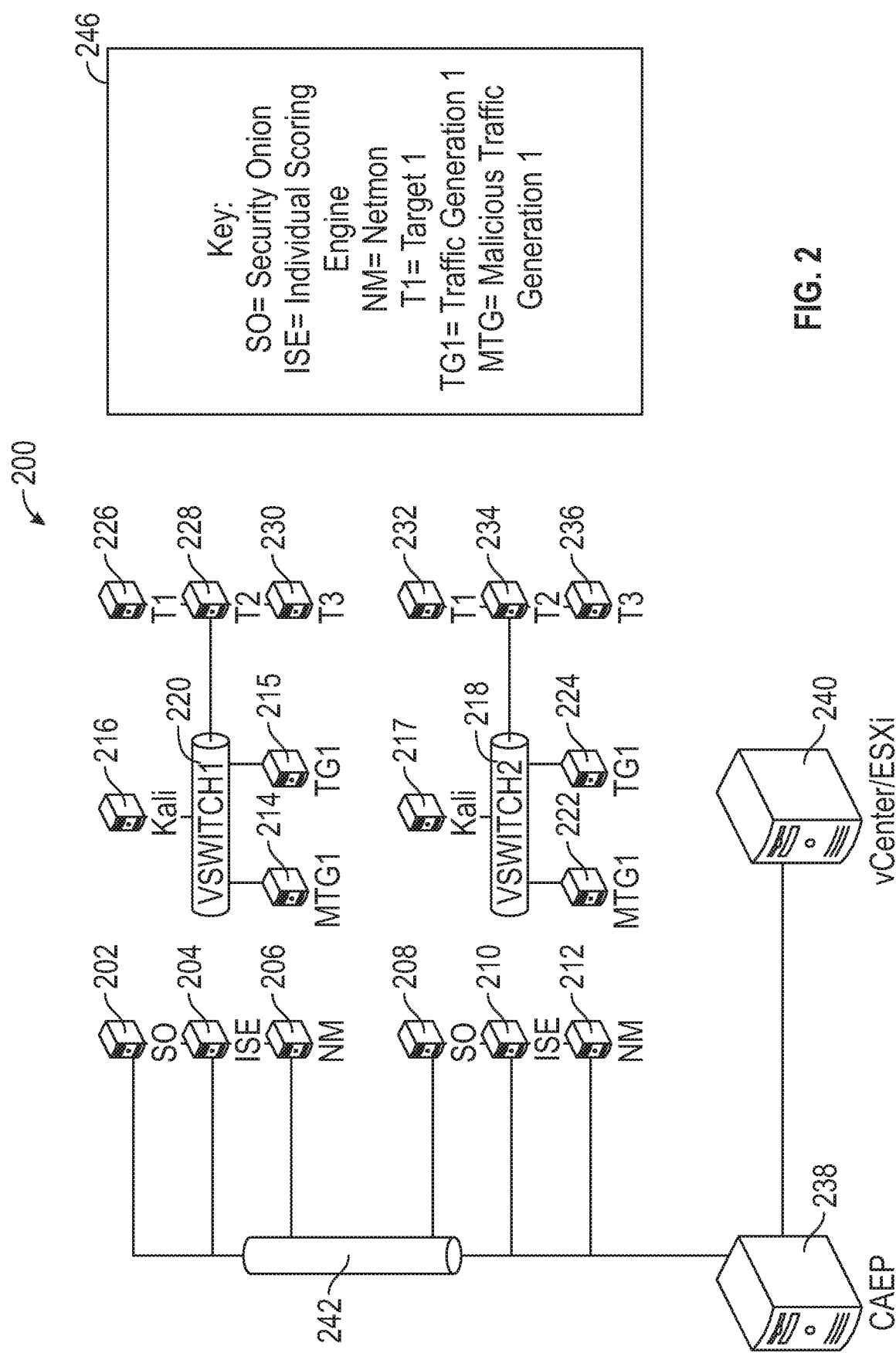
FIG. 2 illustrates a network diagram depicting a system for assessing the cybersecurity skills of a participant in the context of a gamified learning environment that includes malicious and non-malicious traffic generation and distributed scoring agents, in accordance with an embodiment.

FIG. 2 illustrates a network diagram depicting a system 200 for assessing the cybersecurity skills of a participant in the context of a gamified learning environment that includes malicious and non-malicious traffic generation and distributed scoring agents, in accordance with an embodiment. The system 200 is an alternative version of the system 100 shown in FIG. 1. That is, FIG. 1 illustrates a network diagram related to a single user. The network diagram of system 200 depicted in FIG. 2, on the other hand, demonstrates an example of how multiple users can use the system 200 at the same time, and with the same network architecture, while still remaining separate and "in their own lane", thereby preventing Participant 1, for example, from seeing or interacting with Participant 2's environment.

The system 200 includes a first virtual switch 220 (labeled "VSWITCH1") and a second virtual switch 218 (labeled "VSWITCH2"). Note that as utilized herein, the term virtual switch (or vSwitch or VSW ITCH) relates to a software application that can allow for communication between virtual machines. A virtual switch does more than just forward data packets. That is, a virtual switch can "intelligently" direct the communication on a network by checking data packets before moving them to a destination. As shown in FIG. 2, the first virtual switch 220 can communicate with a group of servers including a server 202 ("SO"), a server 204 ("ISE"), a server 206 ("NM"), a server 214 ("MTG1"), a server 215 ("TG1"), a server 216 ("Kali"), a server 226 ("T1"), a server 228 ("T2"), and a server 230 ("T3").

Note that a legend box 246 shown in FIG. 2 includes definitions for the aforementioned labels. For example, "SO" is an acronym for "Security Onion", ISE is an acronym for "Individual Scoring Engine", "NM" is an acronym for "Netmon", "T1" represents "Target 1", "MTG" is an acronym for "Malicious Traffic Generation", and so on.

The second virtual switch 218 similarly can communicate with a group of servers including, for example, a server 208 ("SO"), a server 210 ("ISE"), a server 212 ("NM"), a server 217 ("Kali"), a server 222 ("MTG1), a server 224 ("TG1"), a server 232 ("T1), a server 234 ("T2"), and a server 236 ("T3").

The system 200 shown in FIG. 2 can further include a network switch 242 that communicates with the server 202, the server 204, the server 206, the server 208, the server 210, the server, 212, and a server 238. The server 238 ("CAEP") can in turn communicate with a server 240 (e.g., "vCenter/ESXi"). The server 240 can function as a vCenter server, which can be a centralized management server for managing virtual machines and ESXi hosts, and dependant components from a single centralized location. The term ESXi refers to VMware ESXi (formerly ESX), which is an enterprise-class, type-1 hypervisor developed by VMware for deploying and serving virtual computers. As a type-1 hypervisor, ESXi is not a software application that is installed on an operation system (OS); instead, it can include and integrate vital OS components, such as a kernel. Note that the use of the term vCenter/ESXi and ESXi and so on in reference to the server 240 is presented herein for illustrative purposes only and should not be considered a limiting feature of the disclosed embodiments For example, in another embodiment, the server 240 may function as or provide a hypervisor layer, wherein the term hypervisor or VMM (Virtual Machine Monitor) relates to computer software, firmware or hardware that creates and runs virtual machines.

Note that a hypervisor or virtual machine monitor (VMM) is computer software, firmware, or hardware that can create and run a virtual machine. A computer on which a hypervisor runs one or more virtual machines is called a host machine, and each virtual machine is called a guest machine. The hypervisor presents the guest operating systems with a virtual operating system and manages the execution of the guest operating systems. Multiple instances of a variety of operating systems may share the virtualized hardware resources: for example, Linux, Windows, and macOS instances can all run on a single physical x86 machine. This contrasts with operating-system-level virtualization, wherein all instances (usually called containers) can share a single kernel, though the guest operating systems can differ in user space, such as different Linux distributions with the same kernel.

Figure 3:
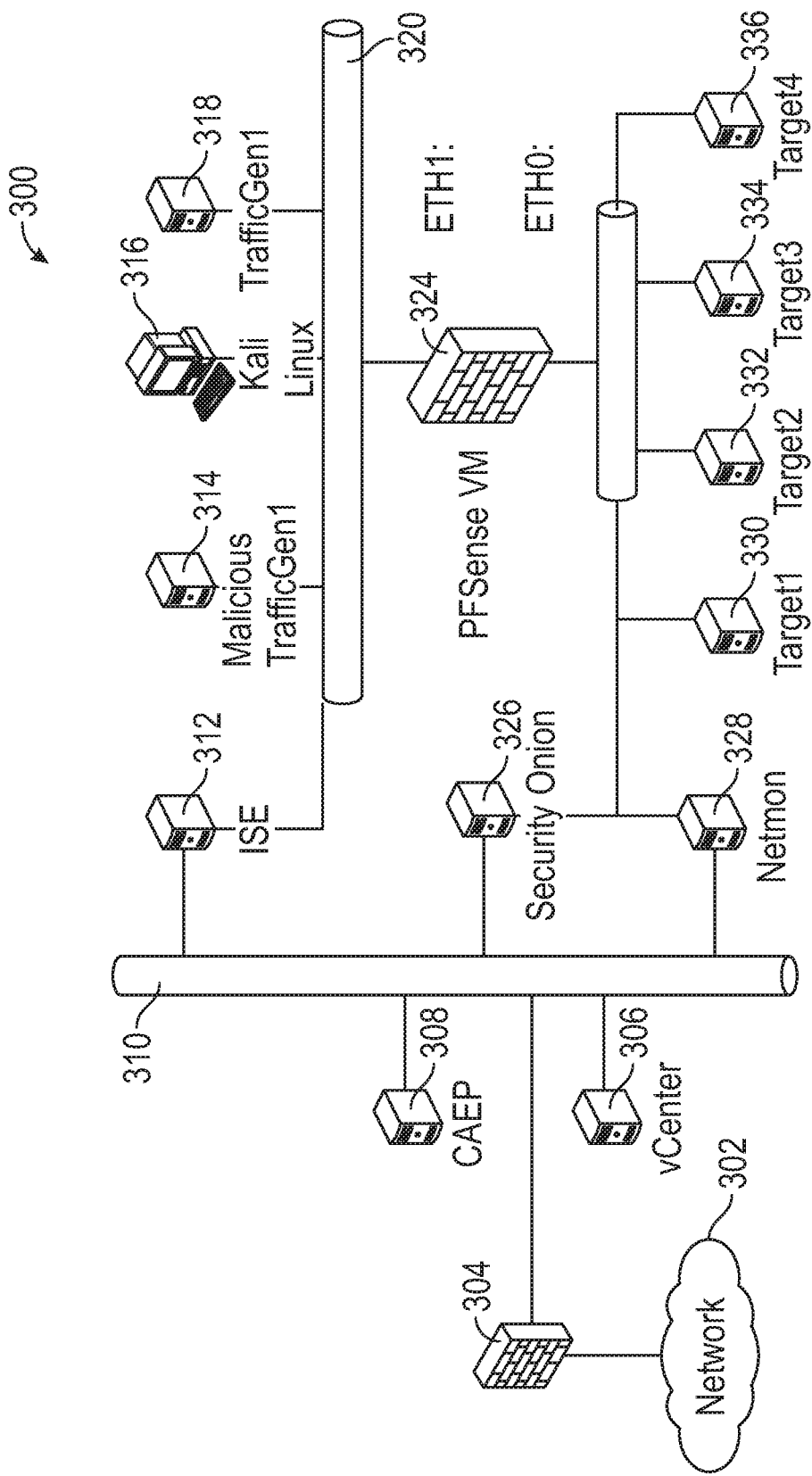
FIG. 3 illustrates a schematic diagram depicting a system for assessing the cybersecurity skills of a participant in the context of a multi-team, multi-player gamified learning environment, in accordance with an embodiment.

FIG. 3 illustrates a schematic diagram depicting a system 300 for assessing the cybersecurity skills of a participant in the context of a multi-team, multi-player gamified learning environment, in accordance with another embodiment. The system 300 is a variation to the system 100 shown in FIG. 1 and the system 200 depicted in FIG. 2. The system 300 includes a server 304 that communicates with a network 302 (e.g., the Internet). The system 300 further includes a server 306 (a "vCenter" server) and a server 308 ("CAEP") that communicate with a network switch 310 that in turn communicates with a server 312 "(ISE"), a server 326 "(SecurityOnion"), and a server 326 ("Netmon").

The server 312 in turn communicates with a network switch 320 that communicates with a server 314 ("MaliciousTrafficGen1"), a server 326 ("Kali Linux"), and a server 318 ("TrafficGen1"). The server 312, the server 314, the server 316, and the server 318 further communicate with a network switch 320 that in turn communicates with a virtual machine 324 ("PFSense VM"). The virtual machine 324 can in turn communicate with the server 326 and the server 328, and a server 330 ("Target1"), a server 332 ("Target2"), a server 334 ("Target3"), and a server 336 ("Target4").

The system 100, the system 200, and the system 300 shown respectively in FIG. 1, FIG. 2, and FIG. 3 can thus implement a gamified learning environment such as a gamified cybersecurity platform for dynamic content, training and assessment. At its basic core, the disclosed systems can implement a training and assessment environment for individual practitioners and participants. The disclosed approach, however, can be extended to include teams from within an organization and can support single team functionality in a single environment (as is the case with system 100). Other embodiments of gamified learning environments are also disclosed herein, such as the various systems illustrated and discussed herein with respect to FIG. 4 to FIG. 19.

A system administrator can create or designate an organization and assign administrative permission for an organization user. This organization user can create structure for groups and teams and assign users to a particular team. In this situation, only a team structure may be available but the CAEP (Cybersecurity Assessment Experience Platform) is operable to incorporate groups and multiple teams within the group and teams without a group (e.g., see system 300).

A player structure may change from experience to experience. In some cases a participant may experience a session on his or her own, and other in other cases the participant may do so as part of a shared experience as part of a team of participants. A participant's role may change from experience to experience for a host of valid business reasons. Teams can include various roles, such as, for example, a team leader, an assistant team leader, and participants. Each team may have multiple users and may need to collaborate to work and perform tasks with respect to a target (e.g., such as Target1, Target2, Target3, etc., discussed above). Note that as utilized herein, the term target can relate to a learning task. A target may include meta data related to, for example, hardware (e.g., RAM, HDD, networking), an IP address, network services, user/administrator accounts, malicious and non-malicious traffic generation, complex service scoring, and a single target load for use in an attack or to defend (e.g., a defensive cyberspace learning experience).

System 100, system 200, and system 300 can be operable to collect a participant's biographical data including education, education location, education major, education minor, employment data, certifications, academic spider, publishing spider, conference attendance and conference spider. Note that the terms "spider" and "spiders" as utilized herein relate to web crawlers. A purpose of such spiders or web crawlers is to gather data from websites for networking analysis (e.g., n link/node networking). For example, a Participant X may enter data indicating that he or she has regarding a CS (Computer Science) major from the University of Texas at San Marcos (UTSM). After this data has been input, an academic spider can crawl the UTSM web page and identify all the professors in the UTSM CS department. A publishing spider can crawl, for example, Google Scholar for all papers published by those professors to include co-authors and citations (e.g., nbi directional citations meaning the documents cited within the publication AND those other papers who cite the work—lather, rinse, repeat).

Conference spiders can likewise determine where (if) those papers were presented at conferences and pull the agendas from such conferences to identify what else is being presented. Using link/node analysis, the data gathered by the spiders can be used to identify "centers of gravity"—those handful of students/professors/universities that are creating the majority of the publications on a given security topic. For example a quick/basic search of this kind may show that one or two universities in South Korea, for example, may be publishing the most regarding the top of SCADA security vulnerabilities.

A real-time chat server can be implemented by which participants can chat with other participants, team members can broadcast messages to whole team or send direct message to a particular team member, and participants can chat with their organization administrator or system administrator in case of any troubleshooting situations. In addition, flags and activities performed in targets by a participant can be rated using a Common Vulnerability Scoring System (CVSS).

A CVSS rating can be used to assign a third party, public risk score to a target. This score can be based on a target possessing one or more known vulnerabilities and whether or not the exploit code used against that vulnerability has been developed (e.g., proof of concept), released (e.g., freely downloadable) or weaponized (e.g., packed into any of the attack frameworks such as Metasploit, Kali, Core Impact, etc.) A CVSS can thus be critical in defining how difficult a target may be to attack AND defend. Think of a CVSS rating as analogous to the Par rating on a golf hole. In this manner, a difficulty rating can be provided, which can be factored into a player's skill rating.

Additionally, users can exploit specific targets (e.g., based on possible exploitations of the target allowed by the administrator). Enhanced target options may also be provided where multiple machines apart from target and host machines can be created to perform research and related work. In addition, an option can be provided for generating hidden assets, which means that different assets may be made available to different team members. Different questions/tasks may be served to different team members.

In some cases, single player versus single player and team versus team modes can be included as experience modes. In addition, injects can be implemented which are basically team exercises. A team may be directed to perform tasks of a scheduled scenario. Individuals may be required to perform defensive tasks. The disclosed CAEP can be operable to keep track of each keystroke by any individual/team. In addition, answers to a task/flag/question can be dynamic and thus different for every participant. Flags/Tasks from an exam module can be assigned to an individual participant, a team or to every participant for submission, with a limited number of flag attempts.

In addition, each participant may obtain his or her own unique puzzle and answer. Also, the tasks/questions sequence may be in a specific order and a particular task/question may be a hint/pointer to the next in order. Agent reporting can be implemented in a manner that includes traffic reporting including service check status and other similar functionality. Additionally, reports/dashboard can be implemented for team wise reporting of traffic and time, and group wise reporting of traffic and time.

Competition support can be provided, which enables administrators to perform a breakdown of a team if the environment resource limits are exceeded. Also it will be possible for admin to assign tiers to team and migrate users to another team if limit exceeds. Rules will be defined based on which users will be divided into teams. If a team limit is exceeded then a user can be transferred to another team. In addition, a user can change the look and feel of the interface.

Figure 4:
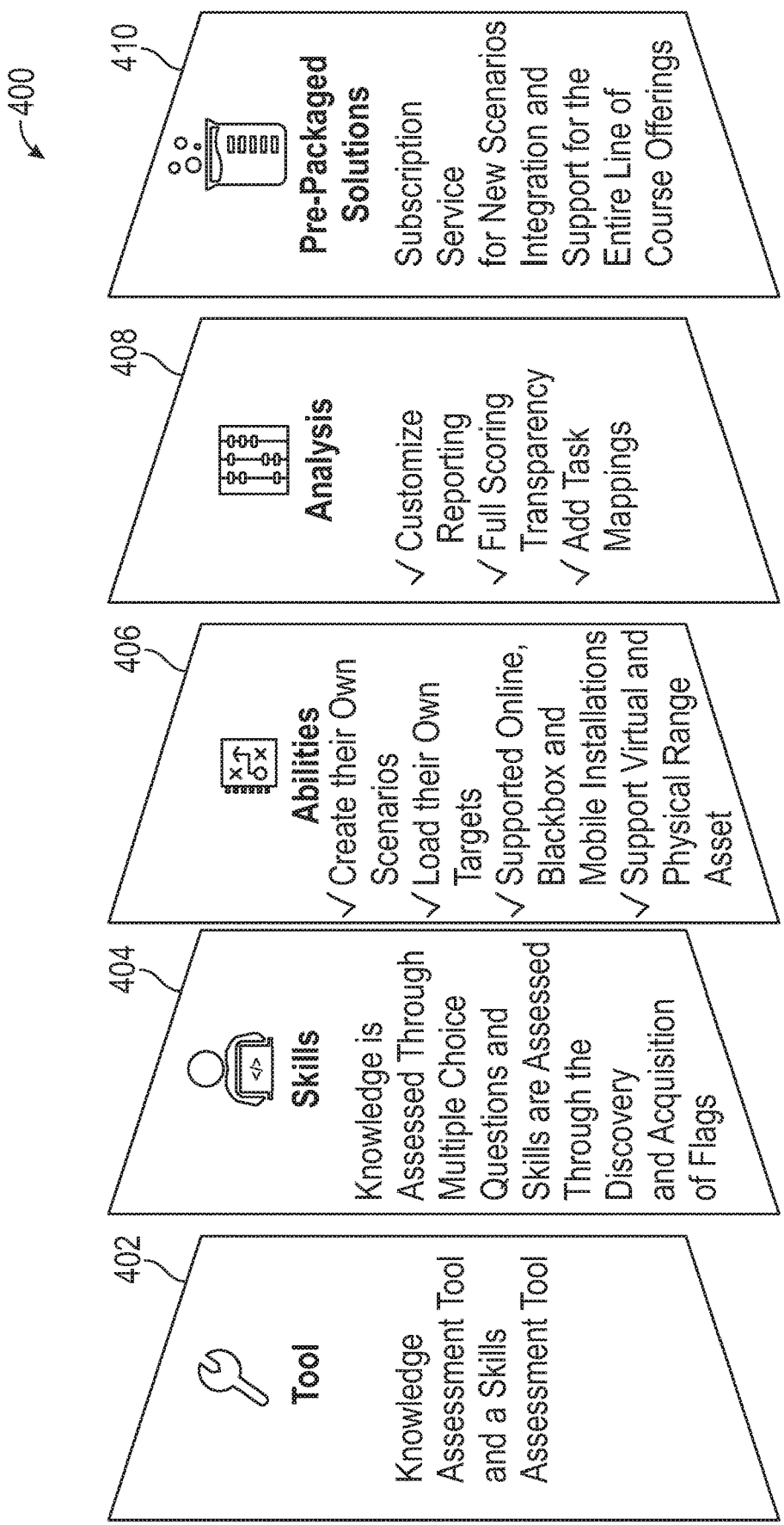
FIG. 4 illustrates a schematic diagram depicting components of a system for assessing a cybersecurity skill of a participant, in accordance with an embodiment.

FIG. 4 illustrates a block diagram depicting a model of components of a system 400 for assessing a cybersecurity skill of a participant, in accordance with an embodiment. The system 400 can include a group of modules including a module 402, a module 404, a module 406, a module 408, and a module 410 which facilitate the training and assessment of a participant in a gamified learning environment. The module 402 can be implemented as a tool (e.g., a software application, a routine, subroutine, etc) that includes a knowledge assessment tool and a skills assessment tool.

The module 402 can provide a skills test in which a participant's cybersecurity knowledge is assessed through multiple choice questions provided through a user interface window. In addition the module 402 allows for the assessment of a participant's cybersecurity skills through the discovery and acquisition of flags. The module 406 provides instructions for allowing a user to create his or her own scenarios, and load his or her own targets, and further can support online blackbox and mobile device (e.g., smartphone, tablet computing device, etc) installations. In addition, the module 406 can support virtual and physical range assets.

The module 408 can implement analysis features such as, for example, customized reporting, full scoring transparency, and the addition of task mappings. The module 410 can provide pre-packaged solutions, such as a subscription service for new scenarios integration and support for a line of course offerings.

Figure 5:
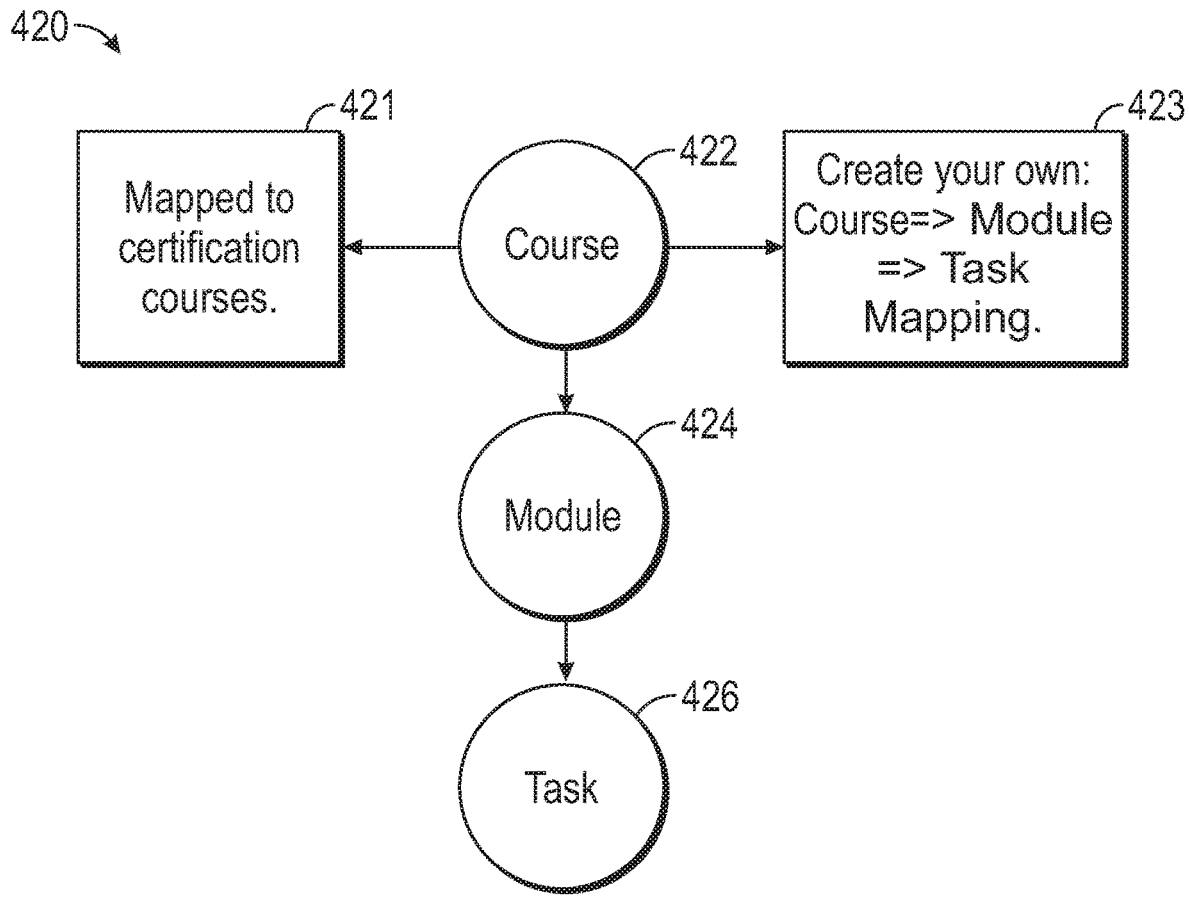
FIG. 5 illustrates a block diagram depicting the basic components of a system for assessing a cybersecurity skill of a participant, in accordance with an embodiment.

FIG. 5 illustrates a block diagram depicting the basic components of a model of a system 420 for assessing a cybersecurity skill of a participant, in accordance with an embodiment. The system 420 can include a course 422 or a group of courses that can be mapped to a module 424 which in turn can be accessed to implement a task 426 in a gamified learning environment. The course 422 (or a group of courses) can be mapped to certification courses, as shown at block 421. In addition, the system 420 offers a "create your own course" feature in which a user can create his or her own course and the map the course to the module 424 to perform one or more tasks such as task 426. Note that as discussed previously, similar or identical parts or elements may be designed by identical reference numerals.

Figure 6:
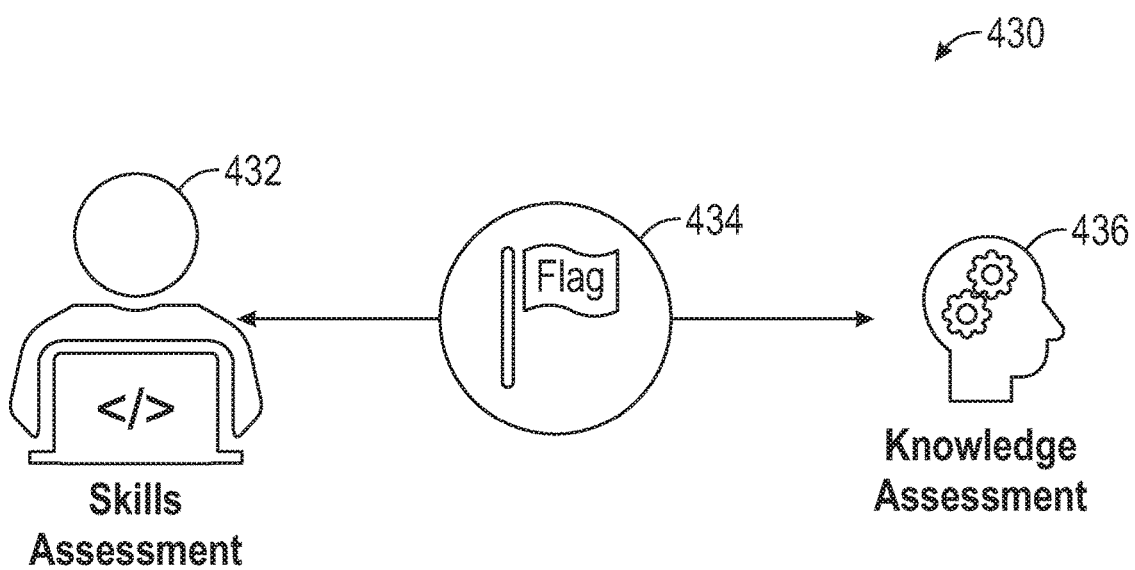
FIG. 6 illustrates a block diagram depicting a system for assessing a cybersecurity skill of a participant gamified learning environment, based on a flag comprising a key/value pair, in accordance with an embodiment.

FIG. 6 illustrates a block diagram depicting a model of a system 430 for assessing a cybersecurity skill of a participant in a gamified learning environment, based on a flag 434 comprising a key/value pair, in accordance with an embodiment. The flag 434 can be utilized in the context of a skills assessment module 432 and a knowledge assessment module 436. Note that the skills assessment module 432 and the knowledge assessment module 436 in some embodiments may each incorporate machine learning in order to facilitate their respective skills assessment and knowledge assessment operations.

The term machine learning relates to methods of data analysis that automate analytical model building. Machine learning is a branch of artificial intelligence based on the idea that systems can learn from data, identify patterns and make decisions with minimal human intervention. Thus, the skills assessment module 432 and the knowledge assessment module 436 can each include machine learning algorithms that build a mathematical model based on sample data, known as training data in order to render predictions or decisions without being explicitly programmed to perform a task. Examples of machine learning algorithms that can be adapted to implement the skills assessment module 432 and/or the knowledge assessment module 436 include supervised learning, unsupervised learning, reinforcement learning, feature learning, sparse dictionary learning, anomaly detection, association rules, and other components such as artificial neural networks, decision trees, support vector machines, and Bayesian networks.

A flag such as the flag 434 can be implemented as any key/value pair provided to a participant, who in turn can provide the value. The participant may be required to perform some action to acquire the flag 434. Flags can reside anywhere (e.g., as data in a database, with a compiled binary, a file in a file system, etc.). Examples of this can include (e.g., in a location/key/value format) a file path/file name/MD5, a target/Username/clear text password, an IP address/IOS version of a router/text string, and so on.

Figure 7:
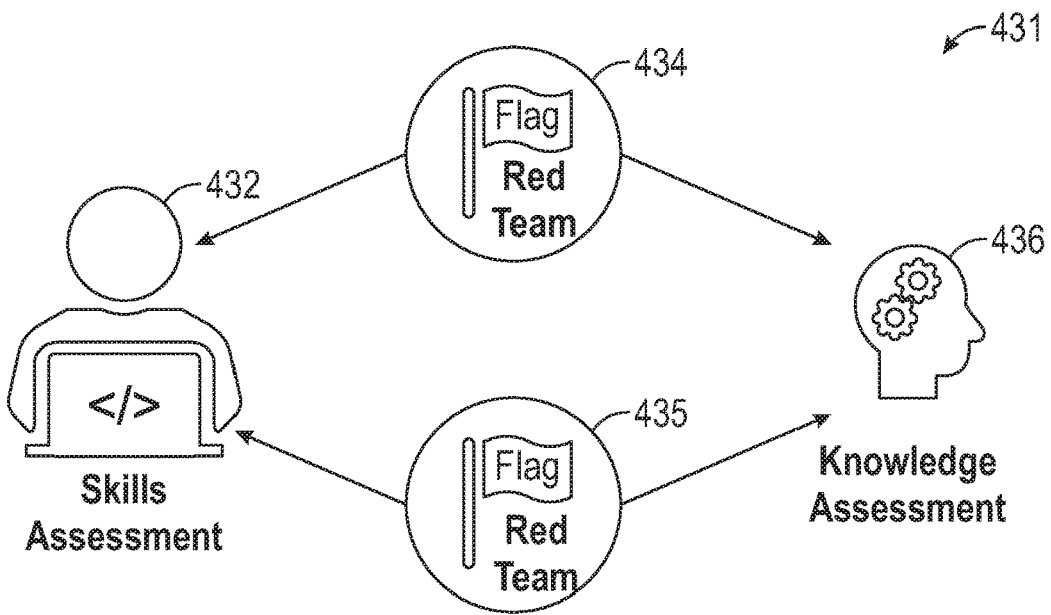
FIG. 7 illustrates a block diagram depicting a system for assessing a cybersecurity skill of a participant in a gamified learning environment, based on a flag associated with an attacker and a flack associated with a defender, in accordance with an embodiment.

FIG. 7 illustrates a block diagram depicting a model of a system 431 for assessing a cybersecurity skill of a participant in a gamified learning environment, based on a flag associated with an attacker and a flack associated with a defender, in accordance with an embodiment. Note that as discussed previously, similar or identical parts or elements may be designed by identical reference numerals. For example the flag 434 shown in FIG. 6 also appears in FIG. 7, FIG. 8, FIG. 9 and so on. Thus, the system 431 includes the flag 434, which can be associated with a "Red Team", and a flag 435 associated with a Blue Team. The flag 434 and the flag 435 can be used for the skills assessment module 432 and the knowledge assessment module 436. In a gamified learning environment, the "Red" flag 434 may be associated with attackers, and may be implemented as a clear text password of an administrator account. In the same gamified learning environment the "Blue" flag 435 may be associated with defenders and may be implemented as a patch version that may be required to fix a specific vulnerability. The model of system 431 allows for a fluid and flexible gamified learning environment based on the use of a flag.

Figure 8:
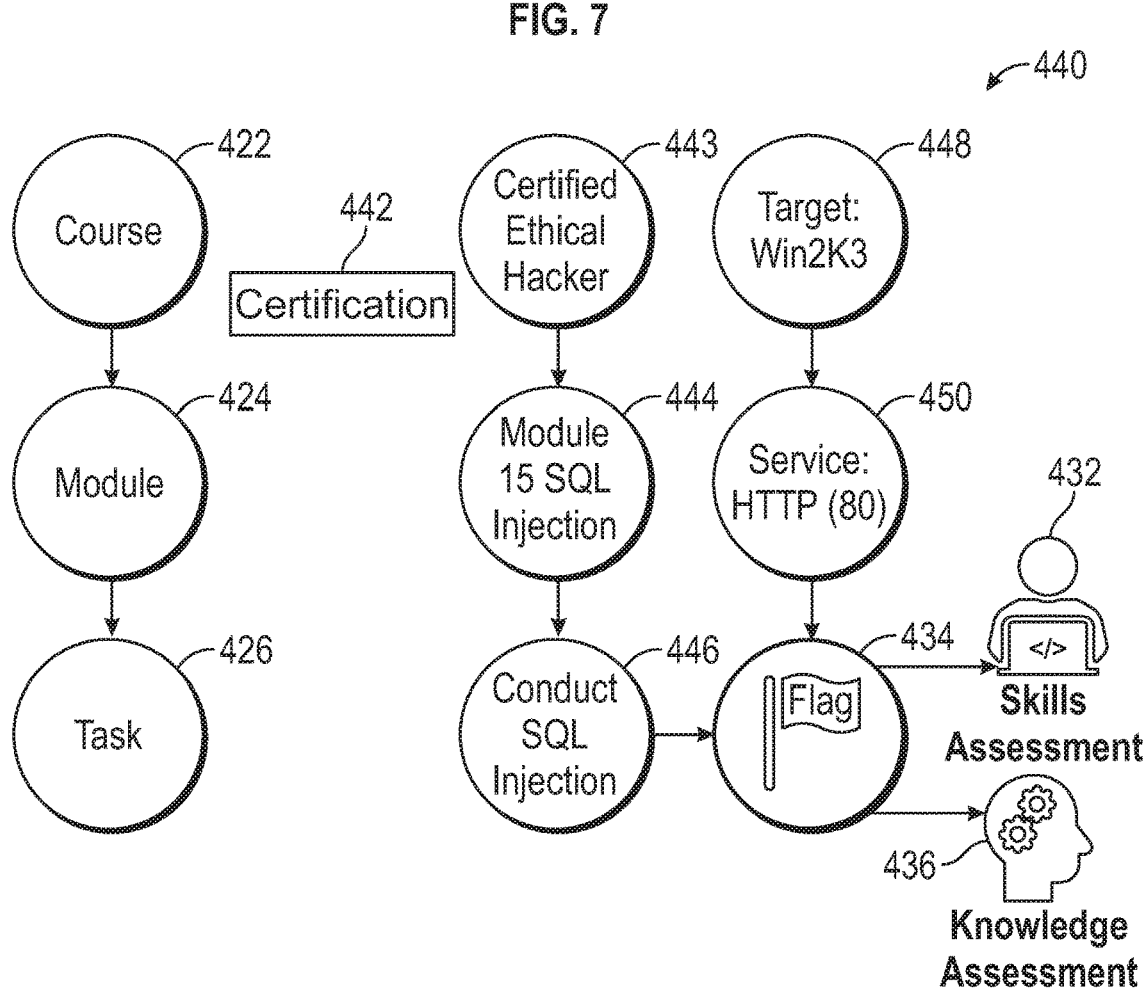
FIG. 8 illustrates a block diagram depicting a system for assessing a cybersecurity skill of a participant in a gamified learning environment including skill assessment and knowledge assessment, in accordance with an embodiment.

FIG. 8 illustrates a block diagram depicting a model of a system 440 for assessing a cybersecurity skill of a participant in a gamified learning environment including skill assessment and knowledge assessment, in accordance with an embodiment. The system 440 includes for example, some of the same features previously discussed, but also includes other features such as a certification module 442 (e.g., operated or provided by a certification entity), a module 443 for certified an "ethical hacker", a module 444 for SQL injection, a model 446 that can conduct and SQL injection and which also can provide the flag 434, a target 448, a module 450 that links to or provides for HTTP service. Skills assessment module 432 and knowledge assessment module 436 can also be implemented as a part of system 440 with respect to the flag 434.

FIG. 9 illustrates a block diagram depicting a module of a system 460 for assessing a cybersecurity skill of a participant in a gamified learning environment including skill assessment and knowledge assessment, in accordance with an embodiment. The system 460 includes a number of the same features shown in FIG. 8 and discussed previously herein, but also includes additional features such as a module 462 that designates a category, a module 464 that can designate a specialty area, a module 466 that can designate work roles, and a module 468 that manages and tracks KSA (Knowledge, Skills, Abilities) and which provides data to the flag 434.

The mapping shown in FIG. 9 can be implemented to allow a flag such as the flag 434 to be used to assess a skill in a class/certification (e.g., course-module-task) or knowledge, skills, abilities and tasks that may be required to perform a work role. The system 460 depicted in FIG. 9 can support, for example the NIST (National Institute of Standards and Technology)/NICE (National Institute for Cybersecurity Education) framework and any job skills mapping. A short version of the course side of the mapping shown in FIG. 9 can be used for content in a class. In addition, mapping content in a job description can be implemented with the system 460, thus allowing different people (e.g., professors versus HR) to come at this in the direction/language most relevant to them.

Figure 10:
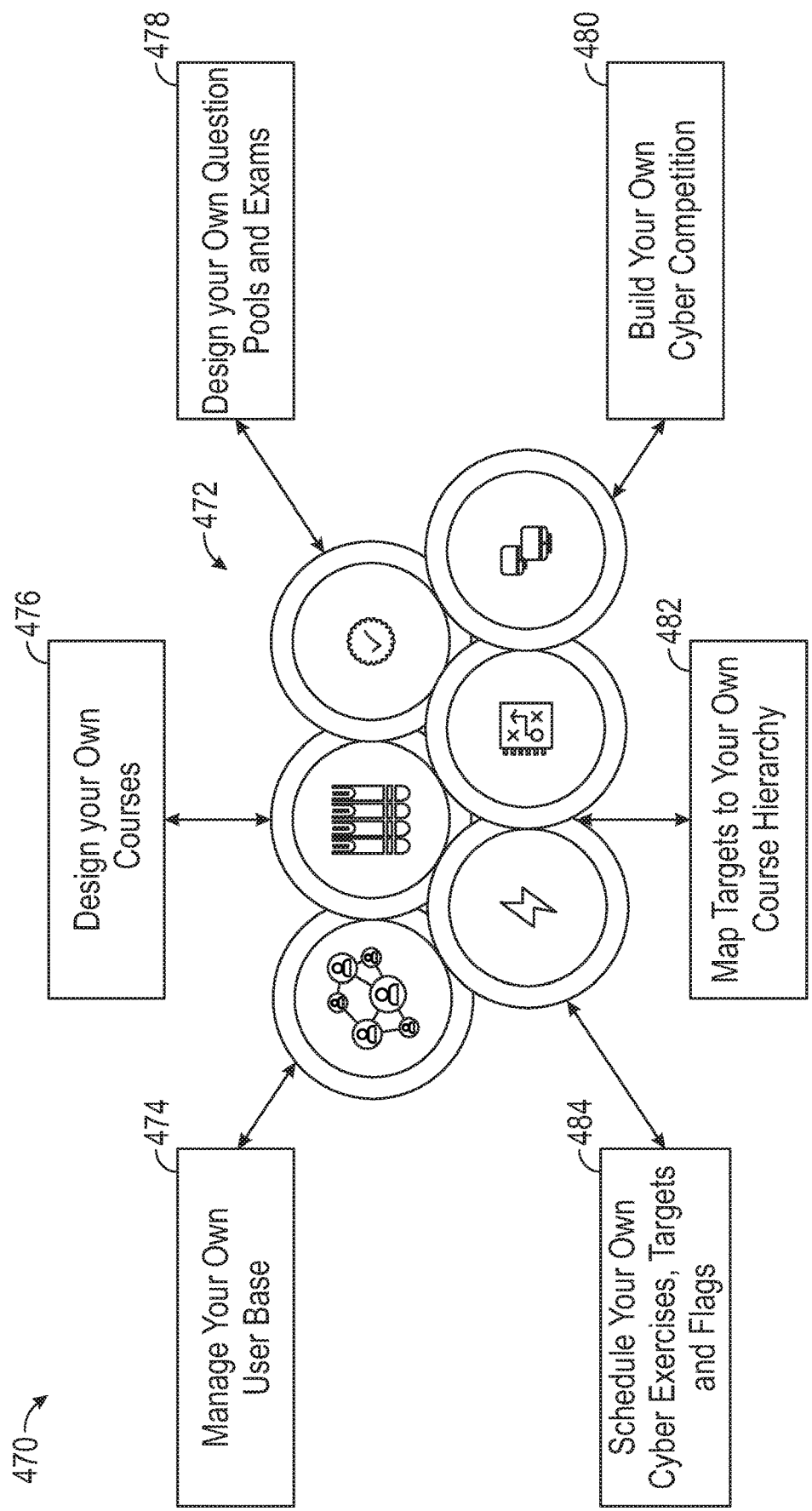
FIG. 10 illustrates a block diagram depicting a system for assessing a cybersecurity skill of a participant in a gamified learning environment including skill assessment and knowledge assessment, in accordance with an embodiment.

FIG. 10 illustrates a block diagram depicting a model of a system 470 for assessing a cybersecurity skill of a participant in a gamified learning environment including skill assessment and knowledge assessment, in accordance with an embodiment. The system 470 can include a number of modules such as a module 474 can that can be accessed by a user to manage his or her own base in a gamified learning environment, a module 476 that can be accessed by a user to design his or her own cybersecurity training and assessment course, a module 478 that allows a user to design his or her own question pools and examinations for a cybersecurity training and assessment, a module 480 that a user may access to build his or her own cybersecurity competition, a module 482 that a user may access to map targets to her or her own course hierarchy, and a module 484 that allows a user to schedule his or her own cybersecurity exercises, targets, and flags.

FIG. 11 illustrates a user interface window 490 for assessing a cybersecurity skill of a participant in a gamified learning environment including knowledge based reporting, in accordance with an embodiment. The user interface window 490 can be implemented via a GUI (Graphical User Interface) as a part of a web application portal, and can implement knowledge based reporting as indicated by arrow 492. The user interface window 490 can display information regarding the total number of questions, the number of questions, and incorrect questions with respect to various course modules such as scanning networks, enumeration, vulnerability analysis and system hacking. Average confidence data can also be displayed in the user interface window 490 with respect to the aforementioned course modules, as indicated by the box 494 shown in FIG. 11. The average confidence data can reveal to a user the fact that the user or participant may believe they have sufficient knowledge of a cybersecurity skill such as system hacking, vulnerability analysis, enumeration and scanning networks, but in fact may not.

FIG. 12 illustrates a user interface window 496 for assessing a cybersecurity skill of a participant in a gamified learning environment including skills based reporting, in accordance with an embodiment. The user interface window 496 can be implemented via a GUI (Graphical User Interface) as a part of a web application portal. As indicated by arrow 493, the user interface window 496 can display information regarding skills based reporting such as, for example, the data contained in the box 498. The information contained in box 498 demonstrates that the disclosed gamified learning environment provides more than simply binary data.

That is, in a basic binary gamified learning environment, results may include simple two dimensional data such as whether or not a flag was or was not captured, whether a question was or was not answered correctly, the amount of time take to capture a flag of answer questions, points that are arbitrary, scoring and leader boards that are confusing, and the lack of the ability to add new challenges, flags and targets.

In addition, in such a binary gamified learning environment, a user is subject to the whims of the vendor that provides the gamified learning environment. For example, imagine a gamified scenario involving two "Red Teamers"—RT1 and RT2. Both participants may acquire the same flag in the same amount of time. However, RT1 may have generated 200 KB of traffic and RT2 may have generated 2000 KB of traffic. Every vendor on the market would rank these two players as the same when they are in fact not the same and clearly there are differences, which cannot be acknowledged and identified with current systems, which build the range first and then attempt to add in assessments.

Figure 21:
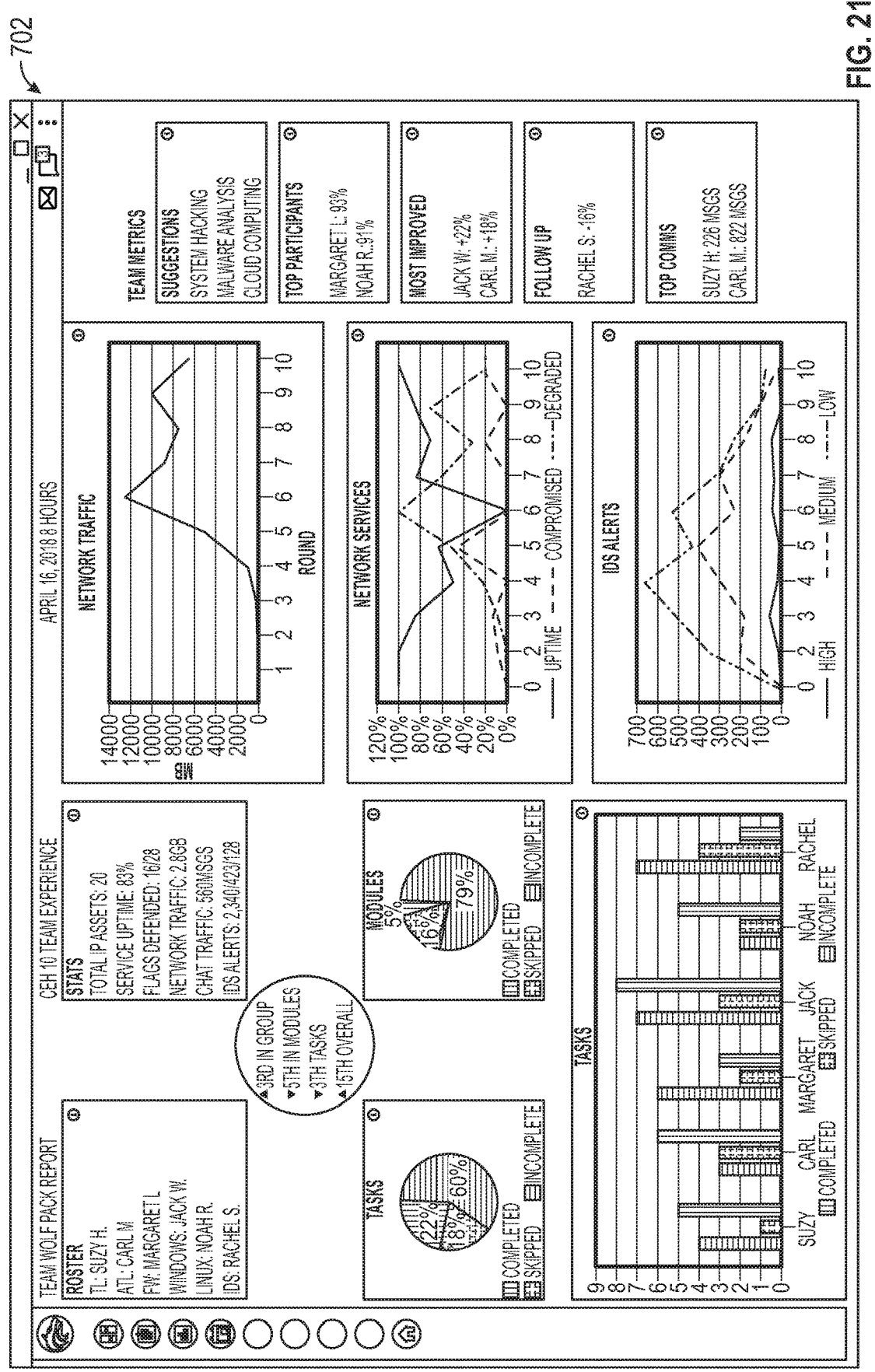
FIG. 21 illustrates a user interface that can be implemented to display team cybersecurity assessment results of participants in a gamified learning environment, in accordance with an example embodiment.
Figure 22:
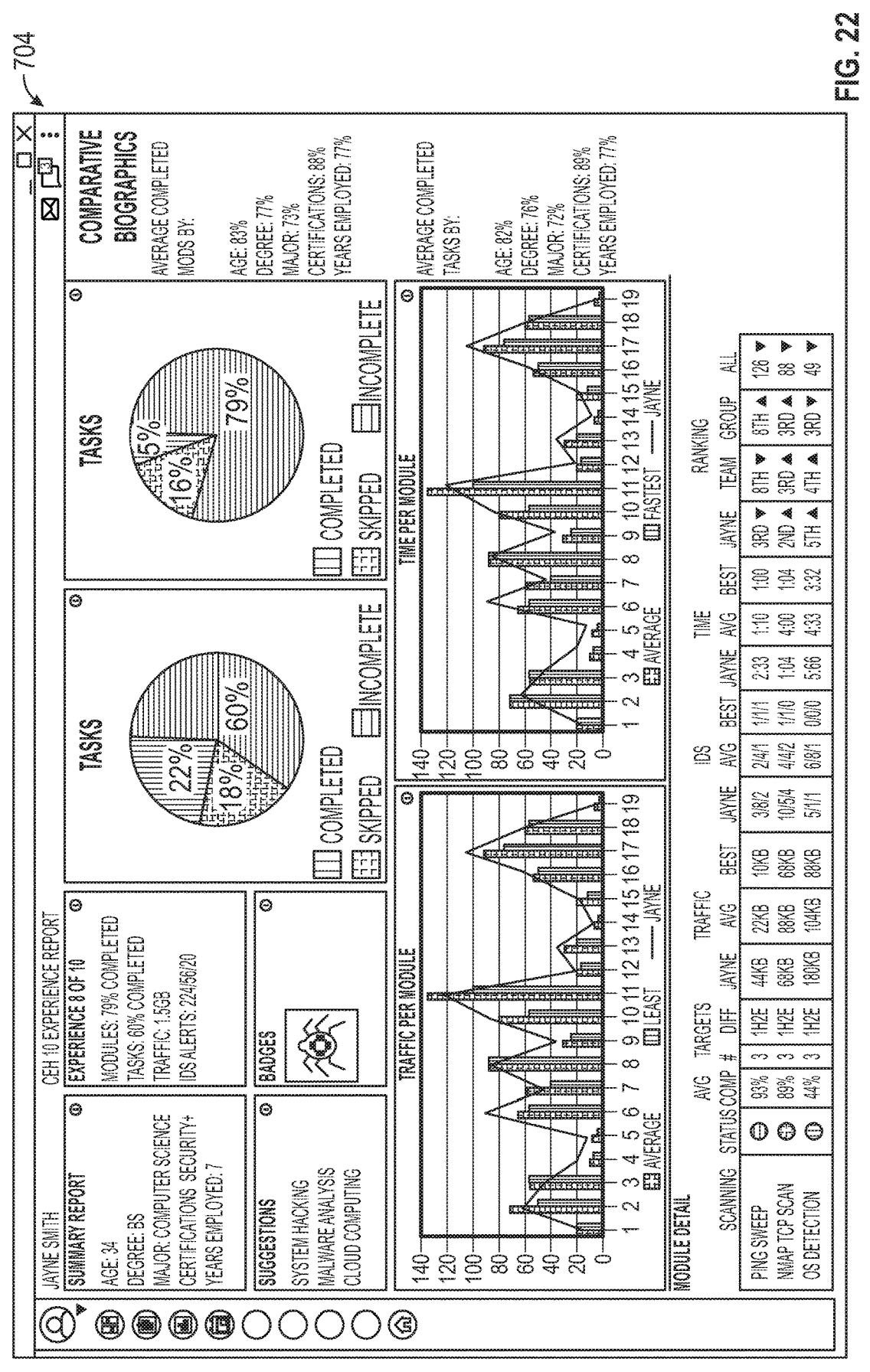
Figure 23:
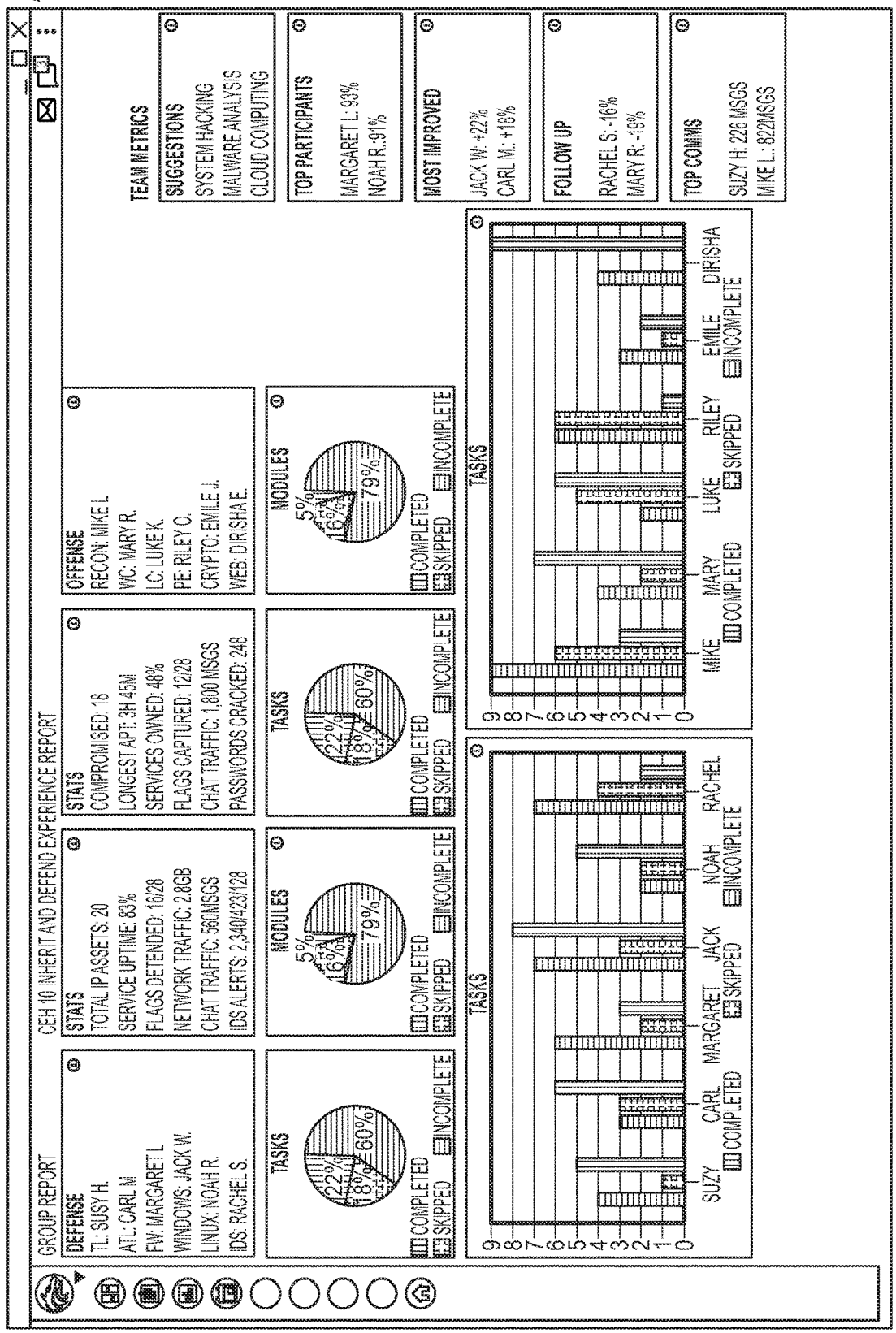
FIG. 23 illustrates a user interface that can be implemented to display group cybersecurity assessment results of participants in a gamified learning environment, in accordance with an example embodiment.

The disclosed approach offers a much more efficient solution in which, for example, binary data is also tracked, along with time information (e.g., how long did it take to capture a flag and answer questions), traffic generation (e.g., how much traffic was generated to complete a task), how many intrusion alerts may have been triggered to complete the task, and service functionality (e.g., data indicative of the impact on critical network services). Examples of user interfaces that can display non-binary scoring information and other data are shown in FIG. 21, FIG. 22 and FIG. 23.

FIG. 13 illustrates a user interface window 502 for assessing a cybersecurity skill of a participant in a gamified learning environment including a field for adding a target, in accordance with an embodiment. The user interface window 502 can be implemented via a GUI (Graphical User Interface) as a part of a web application portal, and can display information and fields, such as, for example, a field 508 that can be accessed by a user to select a VM (Virtual Machine). The field 508 can provide a list of every target VM on the infrastructure. Adding a new target can be thus as simple as uploading a virtual machine from a desktop computer.

The box 504 shown in FIG. 13 indicates specific types of data based on the selected VM, such as, for example, the number of CPUs, the amount of RAM available, the status of VM tools (e.g., "tools Old", RAM usage, and so on. An additional graphical area such as indicated by the box 506 may include fields for enter a username and password.

The disclosed embodiments also provide a much more efficient scoring approach than current systems. For example, the disclosed approach can use points as in other systems, but also incorporates a common vulnerability scoring system, third party published metrics for attack difficult, target scores that change over time to reflect patches, weaponization of attack scripts, etc., transparent and descriptive target rating and target reporting, and in some cases, participant demographic data add-in's that can allow a user to compare performance based on age, education, certification, etc.

FIG. 14 illustrates a user interface window 510 for assessing a cybersecurity skill of a participant in a gamified learning environment including a field for adding a service, in accordance with an embodiment. The user interface window 510 can be implemented via a GUI (Graphical User Interface) as a part of a web application portal, and can include a number of fields for entering data and/or selecting a particular type of service. For example, an HTTP service can be selected, as indicated by field 511 with a particular number of points, such as, for example, selected via a field 512. A GUI button such as a button 514 can be accessed by a user to add a new service.

The user interface window 510 can support multiple services with respect to a single target. A single entry can be used for malicious and non malicious traffic generation, service scoring, capturing a flag, and, for example, providing a blue flag with a list of critical services to defend (e.g., auto generate player guide/rules on demand).

FIG. 15 illustrates a user interface window 520 for assessing a cybersecurity skill of a participant in a gamified learning environment including fields for adding a flag, in accordance with an embodiment. The user interface window 520 can be implemented via a GUI (Graphical User Interface) as a part of a web application portal, and can display a number of fields such as a field 522 to select a flag name based on a question, a field 524 that displays an answer, a field 526 that allows a user to select a course, a field 528 that allows a user to select a task (e.g., "Conduct SQL Injection Attack"), a field 530 that allows a user to select a flag type (e.g., "String), a field 532 that allows a user to select a number of points, a field 534 that allows a user to select a module (e.g., "SQL Injection" module), and a field 536 that allows a user to select a duration (e.g., in minutes).

A GUI button 538 allows a user to add a new flag based on the aforementioned selections, and a GUI button 540 that a user can select when he or she is done making such selections. A GUI button 542 allows a user to move back to a previous screen, and a GUI button 544 when selected by a user, resets the aforementioned selections.

The user interface window 520 shown in FIG. 15 can be based on the fact that every flag can be mapped to a course, which in turn may be mapped to a module (e.g., a course module) that can be mapped to specific tasks. The user interface window 520 can thus be provided to any permitted user to allow the user to create his or her own hierarchy.

Figure 16:
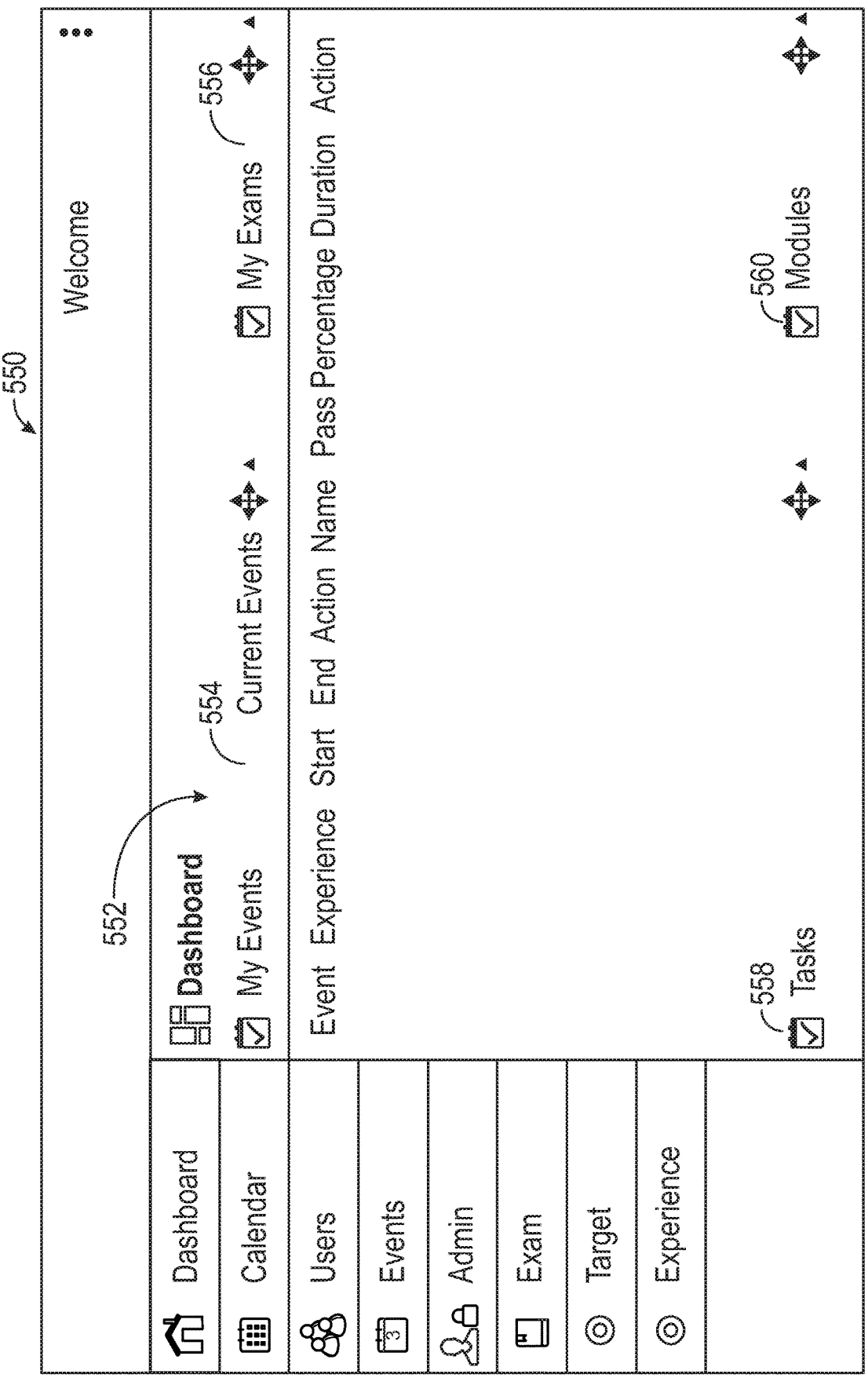
FIG. 16 illustrates a user interface window for assessing a cybersecurity skill of a participant in a gamified learning environment including a GUI dashboard for managing events, in accordance with an embodiment.

FIG. 16 illustrates a user interface window 550 for assessing a cybersecurity skill of a participant in a gamified learning environment including a dashboard 552 for managing events, in accordance with an embodiment. The user interface window 550 can be implemented via a GUI (Graphical User Interface) as a part of a web application portal with the dashboard 552 segmented into a group of graphically displayed sections such as a section 554 for managing events, a section 556 for managing examinations, a section 558 for managing tasks, and a section 560 for managing modules (e.g., course modules and other types of modules as discussed herein).

Note that the term dashboard as utilized herein can relate to a GUI information management tool that can be used to visually track, analyze and display data, metrics, data points and other information for monitoring services, events, systems and processes. A dashboard may be implemented as a customizable GUI dashboard that connects to data files, attachments, services, and API's and may also display such data in the form of graphically tables, line charts, bar charts, gauges and so on in some embodiments. A dashboard can be implemented in the context of a user interface (e.g., somewhat resembling an automobile's "dashboard") that organizes and presents information in a manner that is easy to read and manage, and in an interactive format.

Figure 17:
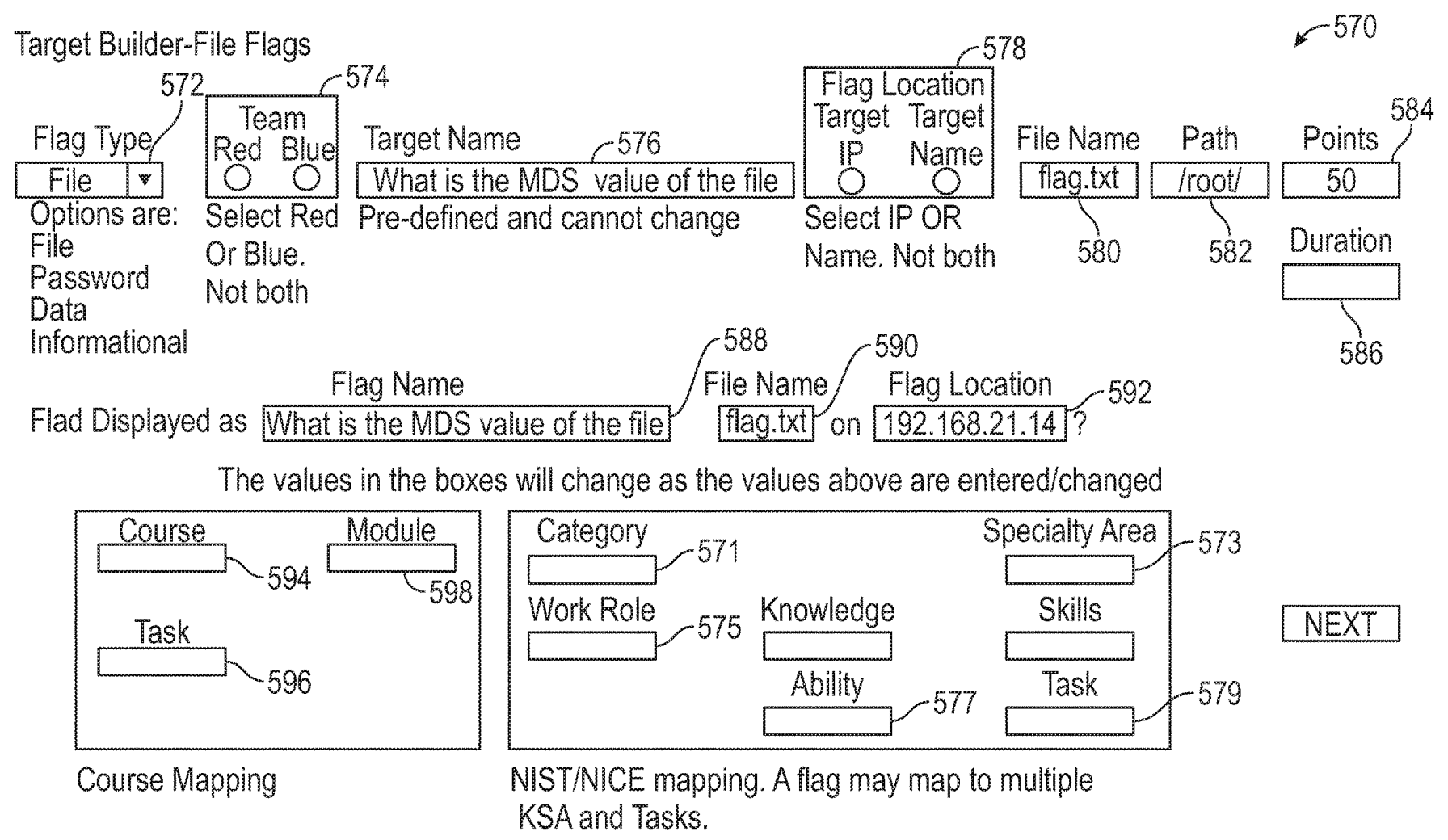

FIG. 17 illustrates a user interface 570 for assessing the cybersecurity skill of a participant in a gamified learning environment including fields for a target builder, in accordance with an embodiment. The user interface 570 can be implemented via a GUI (Graphical User Interface) as a part of a web application portal, and can include a variety of GUI fields and buttons such as a field 572 for selecting a flag type, a GUI button 574 for selecting a particular team color (e.g., Red or Blue), a field 576 for selecting a flag name. Note that the flag name can be predefined and may not be changed once the flag name has been defined. The user interface 570 can further display a GUI button 578 for selecting a target IP or a target name. A field 580 can be used to input a file name, and a field 582 can be used to designate a path. A field 584 can be used to select a number of points, and a field 576 can be used to select the duration of an event.

In addition, a field 588 can be used to select or designate a flag name. A file name can be entered into a field 590, and a file location entered or selected from a field 592. The values in the field 588, the field 590 and/or the field 592 can change, as the values are entered/changed.

Other fields include a field 594 for selecting a course, a field 596 for entering text, a field 598 for selecting a module (e.g., a course module), a field 571 for selecting a category, a field 573 for selecting a specialty area, a field 575 for selecting a work role, a field 577 for selecting an ability, and a field 579 for selecting a task. The user interface 570 shown in FIG. 17 thus demonstrates how job skills can be added via a mapping option of Category-Specialty Area-Work Role-KAST. The field 594, the field 596 and the field 598 can be used to facilitate a course mapping. It should be appreciated that the various fields and graphical fields and boxes shown in FIG. 17 are illustrated and discussed herein for illustrative and exemplary purposes only and should not be considered limiting features of the disclosed embodiments.

Figure 18:
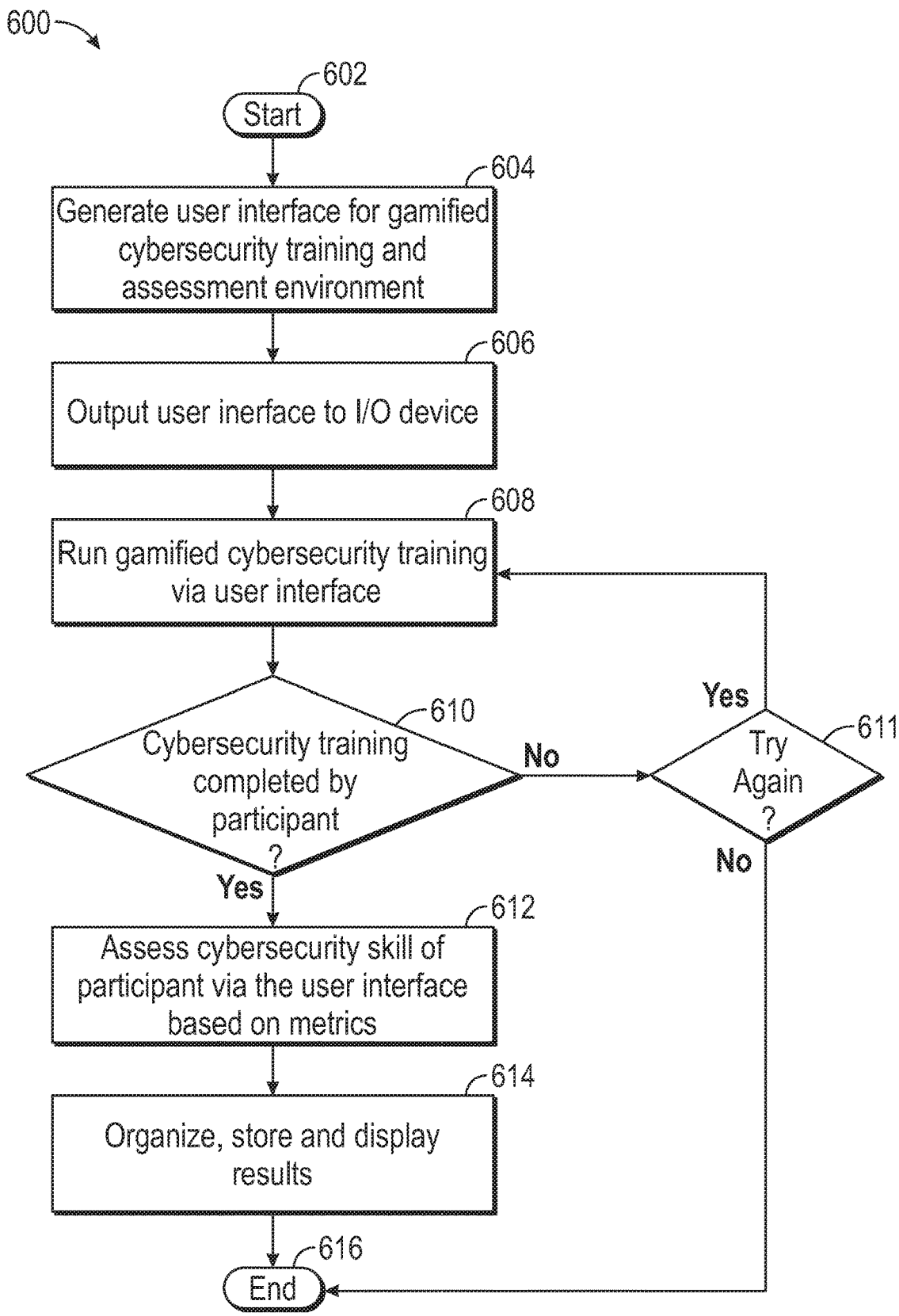
FIG. 18 illustrates a flow chart of operations depicting logical operational steps of a method for assessing a cybersecurity skill of a participant, in accordance with an embodiment.

FIG. 18 illustrates a flow chart of operations depicting logical operational steps of a method 600 for assessing a cybersecurity skill of a participant, in accordance with an embodiment. As depicted at block 602, the process of method 600 can begin. As indicated at block 604, a step or operation can be implemented to generate a user interface for a gamified training and assessment environment. The user interface can include a group of graphically displayed user input fields for receiving data related to a cybersecurity task from a participant of a cybersecurity assessment facilitated by the user interface. The user interface is operable to assess a cybersecurity skill of the participant as a part of the cybersecurity assessment.

Figure 19:
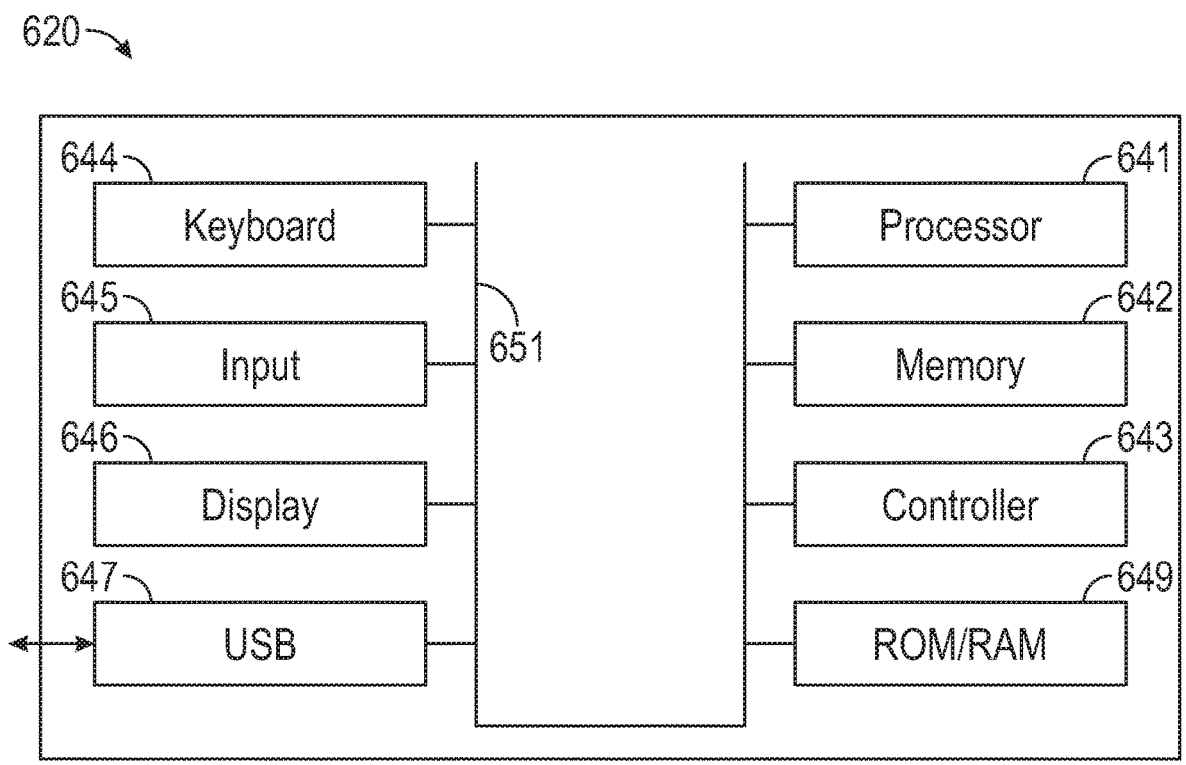
FIG. 19 illustrates a schematic view of a computer system, in accordance with an embodiment.

As depicted next at block 606, a step or operation can be implemented to output the user interface to an I/O (Input/Output) device such as, for example, the data-processing system 620 shown in FIG. 19. Thereafter, as illustrated at block 608, a step or operation can be implemented in which a cybersecurity training session is implemented. Next, as indicated at decision block 610, a test can be performed to determine if the cybersecurity training session has been completed. If not, then an additional test can be performed, as illustrated at decision block 611, to determine if a cybersecurity training session should be implemented again.

Assuming that the cybersecurity training session has been completed, then as depicted at block 612, the cybersecurity skill of the participant can be assessed via the user interface, based on metrics that indicate how the participant achieved the cybersecurity task as compared to at least one other participant of the cybersecurity assessment, and after the cybersecurity task has been completed by the participant via the user interface. The results of the assessment can be then organized, stored in a computer memory and displayed via the user interface as depicted at block 614. The results can be stored for further analysis and retrieval. The process can then end, as indicated at termination block 616.

As can be appreciated by one skilled in the art, embodiments can be implemented in the context of a method, data processing system, or computer program product. Accordingly, embodiments may take the form of a hardware embodiment, a software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in procedural programming languages or in a visually oriented programming environment.

The program code may execute on a user's computer, partly on a user's computer, as a stand-alone software package, or partly on a user's computer and partly on a remote computer or on the remote computer. In the latter scenario, the remote computer may be connected to a user's computer through a bidirectional data communications network (e.g., a local area network (LAN), wide area network (WAN), wireless data network, a cellular network, etc.) or the bidirectional connection may be made to an external computer via most third party supported networks (e.g., through the Internet utilizing an Internet Service Provider).

The embodiments are described at least in part herein with reference to flowchart illustrations and/or block diagrams of methods, systems, and computer program products and data structures according to embodiments. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 20:
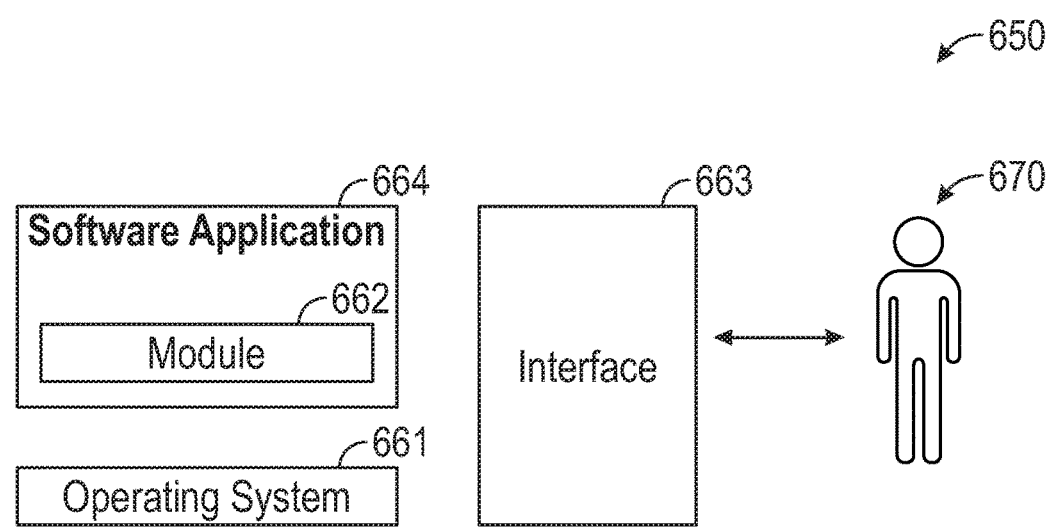
FIG. 20 illustrates a schematic view of a software system including a module, an operating system, and a user interface, in accordance with an embodiment.

FIG. 19 to FIG. 20 are shown only as exemplary diagrams of data-processing environments in which example embodiments may be implemented. It should be appreciated that FIGS. 19-20 are only exemplary and are not intended to assert or imply any limitation with regard to the environments in which aspects or embodiments may be implemented. Many modifications to the depicted environments may be made without departing from the spirit and scope of the disclosed embodiments.

As illustrated in FIG. 19, some embodiments may be implemented in the context of a data-processing system 620 that can include, for example, one or more processors including a CPU (Central Processing Unit) 641 and/or other another processor 349 (e.g., microprocessor, microcontroller etc), a memory 642, an input/output controller 643, a peripheral USB (Universal Serial Bus) connection 647, a keyboard 644 and/or another input device 645 (e.g., a pointing device such as a mouse, trackball, pen device, etc.), a display 646 (e.g., a monitor, touch screen display, etc) and/or other peripheral connections and components including, for example, a memory 644 and/or another memory such as ROM (Read Only Memory) and/or RAM (Random Access Memory) 649. The data-processing system 620 depicted in FIG. 19 is an example of an I/O device.

As illustrated, the various components of data-processing system 620 can communicate electronically through a system bus 651 or similar architecture. The system bus 651 may be, for example, a subsystem that transfers data between, for example, computer components within data-processing system 620 or to and from other data-processing devices, components, computers, etc. The data-processing system 620 may be implemented in some embodiments as, for example, a server in a client-server based network (e.g., the Internet) or in the context of a client and a server (i.e., where aspects are practiced on the client and the server).

In some example embodiments, data-processing system 620 may be, for example, a standalone desktop computer, a laptop computer, a Smartphone, a tablet computing device, a networked computer server, and so on, wherein each such device can be operably connected to and/or in communication with a client-server based network or other types of networks (e.g., cellular networks, Wi-Fi, etc). The data-processing system 620 may communicate with a network, such as, for example, the network 302 shown in FIG. 3 and or other networks or components such as the VLAN 102, and so on. The data-processing system 620 can be, for example, a computer server such as one or more of the servers illustrated and discussed previously herein and/or a desktop computer, a laptop computer, a mobile computing device (e.g., a smartphone, tablet computing device) and so on.

FIG. 20 illustrates a computer software system 650 for directing the operation of the data-processing system 620 depicted in FIG. 19. Software application 664, stored for example in the memory 642 can generally include one or more modules, an example of which is a module 662. The computer software system 650 also can include a kernel or operating system 661 and a shell or interface 663, which may include, for example, the previously discussed user interfaces. One or more application programs, such as the software application 664, may be "loaded" (e.g., transferred from, for example, mass storage or another memory location into the memory 642) for execution by the data-processing system 620.

The data-processing system 620 can receive inputs including one or more user commands and data through the interface 663. These inputs may then be acted upon by the data-processing system 620 in accordance with instructions from the operating system 661 and/or the software application 664. The interface 663 (e.g., a user interface) in some embodiments can serve to display results, whereupon a user 670 may supply additional inputs or can terminate a session. The software application 664 can include module(s) 662, which can, for example, implement instructions or operations such as those discussed herein. The module 662 may also be composed of a group of modules and/or sub-modules.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware). A module may also refer to a "course module" facilitated by a software application/module, which may also be referred to as a program module.

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein refers to a collection of routines and data structures that can perform a particular task or implement a particular data type. A module may be composed of two parts: an interface, which can list the constants, data types, variable, and routines that can be accessed by other modules or routines, and an implementation, which may be private (e.g., accessible only to that module) and which can include source code that actually implements the routines in the module. The term module can also refer to an application, such as a computer program designed to assist in the performance of a specific task, such as word processing, accounting, inventory management, etc. A module may also refer to a physical hardware component or a combination of hardware and software.

The module 662 may include instructions (e.g., steps or operations) for performing operations such as those discussed herein. For example, the module 662 may include instructions or steps for implementing the various operations shown in FIG. 17, such as the operations depicted at block 602, block 604, block 606, block 608, decision block 610, decision block 611, block 612, block 614, and the termination block 616. The module 662 may also include instructions or steps for implementing the various user interfaces, user interface windows, dashboards, and so on discussed herein.

FIG. 21 illustrates a user interface 702 that can be implemented to display team cybersecurity assessment results for participants of a gamified learning environment, in accordance with an example embodiment. In the example depicted in FIG. 21, cyber assessment results associated with a fictional "Team Wolf Pack" are displayed including information such as a roster listing of team members, statistics ("STATS"), data graphs regarding network traffic, network services, and alerts, and so on.

FIG. 22 illustrates a user interface 704 that can be implemented to display individual cybersecurity assessment results for a participant of a gamified learning environment, in accordance with an example embodiment. In the example shown in FIG. 22, data associated with a fictional participant ("Jayne Smith") can be displayed including a summary report containing information about the participant's age, college degree, college major, and so on. Various data graphs can also be displayed in the user interface 704, such as a pie chart of tasks, a pie chart of course modules, traffic per module, time per module, and so on.

FIG. 23 illustrates a user interface 706 that can be implemented to display group cybersecurity assessment results for participants in a gamified learning environment, in accordance with an example embodiment. In the example user interface 706 shown in FIG. 23, a group report can be generated and displayed including results associated with a defense effort or an offense effort in a gamified learning environment along with statistics, metrics, and so on.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for assessing a cybersecurity skill of a participant, comprising:
   generating and outputting to an I/O device, a gamified learning environment comprising a gamified graphical user interface (GUI) comprising a plurality of user input fields for receiving data related to a cybersecurity task from a participant of a cybersecurity assessment facilitated by the gamified GUI and a non-simulated network environment comprising a plurality of virtual switches, the user interface operable to assess a cybersecurity skill of the participant as a part of the cybersecurity assessment, the cybersecurity task comprising a target that includes meta data; and
   assessing the cybersecurity skill of the participant in the gamified learning environment via the gamified GUI, based on a flag comprising a key/value pair in the gamified learning environment and further based on metrics that indicate how the participant achieved the cybersecurity task as compared to at least one other participant of the cybersecurity assessment in the gamified learning environment, after the cybersecurity task has been completed by the participant in the gamified learning environment via the gamified GUI; and
   graphically displaying a GUI button in the gamified GUI that allows the participant to input a new flag based on a plurality of selections including selections indicative of a flag type, a task, a number of points, and a duration, wherein each selection among the plurality of selections is input through a respective field graphically displayed in the gamified GUI.

2. The method of claim 1 wherein:
   the gamified GUI comprises a web application portal; and
   the plurality of virtual switches directs communication on the network by checking data packets before moving the data packets to a destination and each virtual switch among the plurality of virtual switches comprises or is a part of a software application that allows for a communication on the network between virtual machines.

3. The method of claim 1 wherein the gamified GUI is accessible by the participant and the at least one other participant.

4. The method of claim 3 wherein the metrics comprise an amount of network traffic generated during the cybersecurity task performed by the participant and the meta data is related to at least one of: hardware, an IP address, network services, user/administrator accounts, malicious and non-malicious traffic generation, complex service scoring, and a single target load for use in a cyberattack or to defend from the cyberattack as a part of a cyberspace learning experience.

5. The method of claim 1 wherein the metrics comprise a number of network detection alerts generated as a result of the cybersecurity task performed by the participant.

6. The method of claim 1 wherein the metrics comprise an overall difficulty rating of the cybersecurity task.

7. The method of claim 1 wherein the gamified GUI is accessible by a content designer, an assessor, a team leader and a practitioner.

8. The method of claim 7 wherein the gamified GUI is operable to handle range management, assessment, multi-player reporting and multi-event reporting.

9. A system for assessing a cybersecurity skill of a participant, comprising:
   at least one processor and a memory, the memory storing instructions to cause the at least one processor to perform:
      generating and outputting to an I/O device, a gamified learning environment comprising a gamified graphical user interface (GUI) comprising a plurality of user input fields for receiving data related to a cybersecurity task from a participant of a cybersecurity assessment facilitated by the gamified GUI and a non-simulated network environment comprising a plurality of virtual switches, the gamified GUI operable to assess a cybersecurity skill of the participant as a part of the cybersecurity assessment, the cybersecurity task comprising a target that includes meta data; and
      assessing the cybersecurity skill of the participant in the gamified learning environment via the gamified GUI, based on a flag comprising a key/value pair in the gamified learning environment and further based on metrics that indicate how the participant achieved the cybersecurity task as compared to at least one other participant of the cybersecurity assessment in the gamified learning environment, after the cybersecurity task has been completed by the participant in the gamified learning environment via the gamified GUI.

10. The system of claim 9 wherein:
    the gamified learning environment comprises a web application portal; and
    the plurality of virtual switches directs communication on the network by checking data packets before moving the data packets to a destination and each virtual switch among the plurality of virtual switches comprises or is a part of a software application that allows for a communication on the network between virtual machines.

11. The system of claim 9 further comprising:
    a hypervisor comprising a virtual machine monitor (VMM) comprising at least one of: software, firmware or hardware, wherein the VMM creates and runs virtual machines, wherein the gamified GUI is accessible by the participant and the at least one other participant.

12. The system of claim 11 wherein the metrics comprise an amount of network traffic generated during the cybersecurity task performed by the participant.

13. The system of claim 12 wherein the metrics comprise a number of network detection alerts generated as a result of the cybersecurity task performed by the participant, and the meta data is related to at least one of: hardware, an IP address, network services, user/administrator accounts, malicious and non-malicious traffic generation, complex service scoring, and a single target load for use in a cyberattack or to defend from the cyberattack as a part of a cyberspace learning experience.

14. The system of claim 11 wherein the metrics comprise an overall difficulty rating of the cybersecurity task.

15. The system of claim 9 wherein the gamified GUI is accessible by a content designer, an assessor, a team leader and a practitioner.

16. The system of claim 15 wherein the gamified GUI is operable to handle range management, assessment, multi-player reporting and multi-event reporting.

17. A non-transitory computer usable program product for assessing a cybersecurity skill of a participant, the computer usable program product comprising one or more computer-readable storage devices, and program instructions stored on at least one of the one or more storage devices, the stored program instructions comprising:
   program instructions to generate and output to an I/O device, a gamified learning environment comprising a gamified graphical user interface (GUI) comprising a plurality of user input fields for receiving data related to a cybersecurity task from a participant of a cybersecurity assessment facilitated by the gamified GUI and a non-simulated network environment comprising a plurality of virtual switches, the gamified GUI operable to assess a cybersecurity skill of the participant as a part of the cybersecurity assessment, the cybersecurity task comprising a target that includes meta data; and program instructions to assess the cybersecurity skill of the participant in the gamified learning environment via the gamified GUI, based on a flag comprising a key/value pair in the gamified learning environment and further based on metrics that indicate how the participant achieved the cybersecurity task as compared to at least one other participant of the cybersecurity assessment in the gamified learning environment, after the cybersecurity task has been completed by the participant in the gamified learning environment via the gamified GUI.

18. The non-transitory computer usable program product of claim 17 wherein:
the gamified GUI comprises a web application portal;
the gamified GUI is accessible by the participant and the at least one other participant; and
the plurality of virtual switches directs communication on the network by checking data packets before moving the data packets to a destination and each virtual switch among the plurality of virtual switches comprises or is a part of a software application that allows for a communication on the network between virtual machines.

19. The non-transitory computer usable program product of claim 18 wherein the metrics comprise at least one of:
an amount of network traffic generated during the cybersecurity task performed by the participant;
a number of network detection alerts generated as a result of the cybersecurity task performed by the participant; and
an overall difficulty rating of the cybersecurity task.

20. The non-transitory computer usable program product of claim 19 wherein:
the gamified GUI is operable to handle range management, assessment, multi-player reporting and multi-event reporting;
the plurality of virtual switches directs communication on the network by checking data packets before moving the data packets to a destination;
the gamified GUI is accessible by a content designer, an assessor, a team leader, and a practitioner.

* * * * *